(12) United States Patent
Sinnet et al.

(10) Patent No.: US 12,135,533 B2
(45) Date of Patent: Nov. 5, 2024

(54) AUTOMATED KITCHEN SYSTEM FOR ASSISTING HUMAN WORKER PREPARE FOOD

(71) Applicant: Miso Robotics, Inc., Pasadena, CA (US)

(72) Inventors: Ryan W. Sinnet, Pasadena, CA (US); Robert Anderson, Pasadena, CA (US)

(73) Assignee: Miso Robotics, Inc., Pasadena, CA (US)

( * ) Notice: Subject to any disclaimer, the term of this patent is extended or adjusted under 35 U.S.C. 154(b) by 0 days.

(21) Appl. No.: 17/829,466

(22) Filed: Jun. 1, 2022

(65) Prior Publication Data

US 2022/0386807 A1 Dec. 8, 2022

Related U.S. Application Data

(60) Provisional application No. 63/196,636, filed on Jun. 3, 2021.

(51) Int. Cl.
*G05B 19/042* (2006.01)
*A23L 5/10* (2016.01)
*B25J 11/00* (2006.01)

(52) U.S. Cl.
CPC .............. *G05B 19/042* (2013.01); *A23L 5/15* (2016.08); *B25J 11/0045* (2013.01); *G05B 2219/2643* (2013.01)

(58) Field of Classification Search
CPC .......... G05B 19/042; G05B 2219/2643; G05B 2219/2642; A23L 5/15
See application file for complete search history.

(56) References Cited

U.S. PATENT DOCUMENTS

| | | | |
|---|---|---|---|
| 1,760,462 A | 5/1930 | Yeo |
| 2,658,444 A | 11/1953 | Wheeler |
| 3,302,871 A | 2/1967 | Kettering et al. |
| 4,015,494 A | 4/1977 | Spooner et al. |
| 4,052,319 A | 10/1977 | Friedman |
| 4,545,723 A | 10/1985 | Clark |

(Continued)

FOREIGN PATENT DOCUMENTS

| | | |
|---|---|---|
| CN | 110279287 A | 9/2019 |
| DE | 202014001807 U1 | 3/2014 |

(Continued)

OTHER PUBLICATIONS

B. Siciliano & O. Khatib, Handbook of Robotics, published by Springer-Verlag Berlin (2008).

(Continued)

*Primary Examiner* — Thien S Tran
(74) *Attorney, Agent, or Firm* — Batt IP A Law Corporation; Richard Batt

(57) ABSTRACT

An automated kitchen assistant system inspects a food preparation area in the kitchen environment using a plurality of sensors or cameras. A trained model computes the identity and the location of the food item. In embodiments, the food items are on a grill, and the automated kitchen assistant system is operable to compute the time remaining to remove or flip each of the food items. The output may further be utilized to command a robotic arm, kitchen worker, or otherwise assist in food preparation. Related methods are also described.

11 Claims, 14 Drawing Sheets

(56) References Cited

U.S. PATENT DOCUMENTS

| | | |
|---|---|---|
| 4,853,771 A | 8/1989 | Witriol et al. |
| 4,919,950 A | 4/1990 | Mak |
| 4,922,435 A | 5/1990 | Cahlander et al. |
| 4,979,864 A | 12/1990 | Cahlander et al. |
| 5,132,914 A | 7/1992 | Cahlander et al. |
| 5,230,279 A | 7/1993 | McFadden et al. |
| 5,285,604 A | 2/1994 | Carlin |
| 5,386,762 A | 2/1995 | Gokey |
| 5,389,764 A | 2/1995 | Nishii et al. |
| 5,458,384 A | 10/1995 | Liu et al. |
| 5,466,025 A | 11/1995 | Mee |
| 5,833,295 A | 11/1998 | Farlow, Jr. |
| 5,893,051 A | 4/1999 | Tomohiro |
| D412,642 S | 8/1999 | King |
| D492,112 S | 6/2004 | Hardy |
| 7,174,830 B1 | 2/2007 | Dong |
| 7,383,963 B2 | 6/2008 | Svabek et al. |
| 7,920,962 B2 | 4/2011 | D'Andrea et al. |
| 7,971,450 B2 | 7/2011 | Furlanetto et al. |
| 8,276,505 B2 | 10/2012 | Buehler |
| 8,610,037 B2 | 12/2013 | Polt |
| D702,084 S | 4/2014 | Matos |
| 8,820,313 B1 | 9/2014 | Lutes |
| 9,220,371 B1 | 12/2015 | Demirakos et al. |
| 9,233,470 B1 | 1/2016 | Bradski et al. |
| 9,285,589 B2 | 3/2016 | Osterhout et al. |
| 9,483,875 B2 | 11/2016 | Theimer et al. |
| 9,538,880 B2 | 1/2017 | Riefenstein |
| 9,542,621 B2 | 1/2017 | He et al. |
| 9,785,911 B2 | 10/2017 | Galluzzo et al. |
| 9,815,191 B2 | 11/2017 | Oleynik et al. |
| 10,005,184 B2 | 6/2018 | Gerio et al. |
| D825,266 S | 8/2018 | Iorio et al. |
| 10,112,771 B2 | 10/2018 | D'andrea et al. |
| 10,154,756 B2 | 12/2018 | Hall et al. |
| 10,293,488 B2 | 5/2019 | Hall et al. |
| 10,422,870 B2 | 9/2019 | Mindell et al. |
| 10,682,765 B2 | 6/2020 | Mirkhaef et al. |
| 10,919,144 B2 | 2/2021 | Sinnet et al. |
| 11,167,421 B2 | 11/2021 | Sinnet |
| 11,192,258 B2 | 12/2021 | Sinnet et al. |
| 11,518,044 B2 | 12/2022 | Liu et al. |
| 11,577,401 B2 | 2/2023 | Sinnet et al. |
| 11,738,934 B2 | 8/2023 | Jain et al. |
| 2002/0028127 A1 | 3/2002 | Hart et al. |
| 2002/0082924 A1 | 6/2002 | Koether |
| 2004/0011321 A1 | 1/2004 | Hawaj |
| 2004/0111321 A1 | 6/2004 | Kargman |
| 2004/0154474 A1 | 8/2004 | Chan |
| 2004/0172380 A1 | 9/2004 | Zhang et al. |
| 2005/0036668 A1* | 2/2005 | McLennan ............ G06T 7/0012 |
| | | 382/128 |
| 2005/0049940 A1 | 3/2005 | Tengler et al. |
| 2005/0193901 A1 | 9/2005 | Buehler |
| 2006/0278216 A1 | 12/2006 | Gagas et al. |
| 2007/0122000 A1 | 5/2007 | Venetianer et al. |
| 2008/0110347 A1 | 5/2008 | Wong |
| 2009/0192921 A1 | 7/2009 | Hicks |
| 2009/0210090 A1 | 8/2009 | Takemitsu et al. |
| 2009/0262206 A1 | 10/2009 | Park |
| 2010/0132692 A1 | 6/2010 | Shaffer |
| 2010/0182136 A1 | 7/2010 | Pryor |
| 2010/0296903 A1 | 11/2010 | Shah et al. |
| 2011/0153614 A1 | 6/2011 | Solomon |
| 2011/0264266 A1 | 10/2011 | Kock |
| 2012/0024170 A1 | 2/2012 | Fritz-Jung et al. |
| 2013/0033057 A1 | 2/2013 | Markham |
| 2013/0275236 A1 | 10/2013 | Koke et al. |
| 2013/0302483 A1 | 11/2013 | Riefenstein |
| 2014/0031978 A1 | 1/2014 | Takata |
| 2014/0062112 A1 | 3/2014 | Cho |
| 2014/0089299 A1 | 3/2014 | Kamei et al. |
| 2014/0157698 A1 | 6/2014 | Cihak et al. |
| 2014/0184496 A1 | 7/2014 | Gribetz et al. |
| 2014/0203012 A1 | 7/2014 | Corona et al. |
| 2014/0234066 A1 | 8/2014 | Mathi et al. |
| 2014/0324607 A1 | 10/2014 | Frehn et al. |
| 2014/0334691 A1 | 11/2014 | Cho et al. |
| 2014/0351068 A1 | 11/2014 | Renfroe |
| 2014/0363266 A1 | 12/2014 | Cooper |
| 2015/0019354 A1 | 1/2015 | Chan et al. |
| 2015/0290795 A1* | 10/2015 | Oleynik ................ A47J 36/321 |
| | | 700/257 |
| 2015/0310624 A1 | 10/2015 | Bulan et al. |
| 2016/0037958 A1 | 2/2016 | Freymiller et al. |
| 2016/0078694 A1 | 3/2016 | Swift |
| 2016/0180546 A1* | 6/2016 | Kim ....................... G06T 7/248 |
| | | 382/103 |
| 2016/0239705 A1 | 8/2016 | Masood et al. |
| 2016/0293470 A1 | 10/2016 | Oremus et al. |
| 2016/0307459 A1 | 10/2016 | Chestnut et al. |
| 2016/0327279 A1 | 11/2016 | Bhogal et al. |
| 2016/0327281 A1* | 11/2016 | Bhogal .................. F24C 7/085 |
| 2016/0334799 A1 | 11/2016 | D'Andrea et al. |
| 2016/0368742 A1 | 12/2016 | Maile |
| 2017/0011319 A1 | 1/2017 | Elliot et al. |
| 2017/0024789 A1 | 1/2017 | Frehn et al. |
| 2017/0030515 A1 | 2/2017 | Johnson et al. |
| 2017/0116661 A1 | 4/2017 | Sundaram |
| 2017/0130968 A1 | 5/2017 | Nagraj et al. |
| 2017/0154803 A1 | 6/2017 | Wang et al. |
| 2017/0169315 A1 | 6/2017 | Vaca Castano et al. |
| 2017/0178070 A1 | 6/2017 | Wang et al. |
| 2017/0206431 A1 | 7/2017 | Sun et al. |
| 2017/0252922 A1 | 9/2017 | Levine et al. |
| 2017/0290345 A1 | 10/2017 | Garden et al. |
| 2017/0305015 A1 | 10/2017 | Krasny et al. |
| 2017/0348854 A1 | 12/2017 | Oleynik |
| 2017/0364073 A1 | 12/2017 | Guy |
| 2018/0046978 A1 | 2/2018 | Tartal et al. |
| 2018/0150661 A1 | 5/2018 | Hall et al. |
| 2018/0339463 A1 | 11/2018 | Stone et al. |
| 2018/0345485 A1 | 12/2018 | Sinnet et al. |
| 2018/0365630 A1 | 12/2018 | Seals et al. |
| 2019/0176338 A1 | 6/2019 | Zito et al. |
| 2019/0256301 A1 | 8/2019 | Hashimoto et al. |
| 2019/0297899 A1 | 10/2019 | Weiss |
| 2019/0352028 A1 | 11/2019 | Mirkhaef et al. |
| 2019/0389082 A1 | 12/2019 | Higo |
| 2020/0009638 A1 | 1/2020 | Asada et al. |
| 2020/0030966 A1 | 1/2020 | Hasegawa et al. |
| 2020/0046168 A1 | 2/2020 | Sinnet et al. |
| 2020/0047349 A1 | 2/2020 | Sinnet et al. |
| 2020/0054175 A1 | 2/2020 | Roy et al. |
| 2020/0087069 A1 | 3/2020 | Johnson et al. |
| 2020/0121125 A1 | 4/2020 | Zito et al. |
| 2020/0238534 A1 | 7/2020 | Goldberg et al. |
| 2020/0254641 A1 | 8/2020 | Hocker et al. |
| 2020/0337343 A1 | 10/2020 | Cretors |
| 2021/0030199 A1 | 2/2021 | Olson et al. |
| 2021/0094188 A1 | 4/2021 | Rodionov et al. |
| 2021/0107724 A1 | 4/2021 | Cohen |
| 2021/0208171 A1 | 7/2021 | Guarracina et al. |
| 2021/0276756 A1 | 9/2021 | Dunkel |
| 2021/0394371 A1 | 12/2021 | Ishizu et al. |

FOREIGN PATENT DOCUMENTS

| | | |
|---|---|---|
| EP | 1324865 A1 | 7/2003 |
| FR | 2578717 A | 9/1986 |
| JP | 2004062750 A | 2/2004 |
| JP | 2008296308 A | 12/2008 |
| JP | 2009106734 A | 5/2009 |
| JP | 2009297880 A | 12/2009 |
| JP | 4655912 B2 | 3/2011 |
| JP | 5814305 B2 | 11/2015 |
| WO | 0170087 A2 | 9/2001 |
| WO | 2006006624 A1 | 1/2006 |
| WO | 2012020858 A1 | 2/2012 |
| WO | 2015100958 A1 | 7/2015 |
| WO | 2015143800 A1 | 10/2015 |
| WO | 2016040361 A1 | 3/2016 |
| WO | 2015125017 A3 | 6/2016 |
| WO | 2016140622 A1 | 9/2016 |

(56) References Cited

FOREIGN PATENT DOCUMENTS

| WO | 2017114014 A1 | 7/2017 |
|---|---|---|
| WO | 2017103682 A3 | 8/2017 |
| WO | 2017218548 A1 | 12/2017 |
| WO | 2018031489 A1 | 2/2018 |
| WO | 2018165038 A1 | 9/2018 |
| WO | 2018165105 A1 | 9/2018 |
| WO | 2019079345 A1 | 4/2019 |
| WO | PCTUS2272666 | 6/2022 |
| WO | 2022256799 A1 | 12/2022 |

OTHER PUBLICATIONS

Beucher, Serge, and Fernand Meyer. "The morphological approach to segmentation: the watershed transformation." Optical Engineering-New Yark-Marcel Dekker Incorporated—34 (1992): 433-433.

Bonanni et al., "Counterintelligence: Augmented Reality Kitchen", CHI 2005, Portland, Oregon, USA. (Apr. 2, 2005), URL: http://citeseerx.ist.psu.edu/viewdoc/summary?doi=10.1.1.88.2875, (Jun. 12, 2018), XP055559956.

International Search Report and Written Opinion of ISA dated Jul. 11, 2018 for PCT/US2018/020948.

International Search Report and Written Opinion of ISA dated Jul. 20, 2018 for PCT/US2018/021066.

International Search Report and Written Opinion of ISA dated Aug. 17, 2022 for PCT/US2022/072666.

Kaiming He, Georgia Gkioxari, Piotr Dollar, and Ross B. Girshick, Mask R-CNN, arXiv, 2017.

Krystal B., The magic of Eatsa, explained, (Mar. 2, 2017), URL: https://www.washingtonpost.com/goingoutguide/the-magic-of-eatsa-explained-order-on-a-screen-pick-up-at-a-cubby/2017/03/02/57c95fb0-f55a-11e6-b9c9-e83fce42fb61_story.html.

Lucas, Bruce D., and Takeo Kanade. "An iterative image registration technique with an application to stereo vision." (1981): 674-679.

Ohta, Yu-Ichi, Takeo Kanade, and Toshiyuki Sakai. "Color information for region segmentation." Computer graphics and image processing 13.3 (1980): 222-241.

Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, vol. 39 Issue 6, Jun. 2017.

Goodfellow et al., Generative adversarial networks, Communications of the ACM, vol. 63, Issue 11, Nov. 2020 pp. 139-144.

Ju Yong Chang, Haesol Park, In Kyu Park, Kyoung Mu Lee, Sang Uk Lee, GPU-friendly multi-view stereo reconstruction using surfel representation and graph cuts, Computer Vision and Image Understanding, vol. 115, Issue 5, 2011, pp. 620-634.

Lin, Tsung-Yi, et al. "Focal loss for dense object detection." Proceedings of the IEEE international conference on computer vision. 2017.

Robot Frying Basket, 2018.

Simon, Dan. "Kalman filtering." Embedded systems programming 14.6 (2001): 72-79.

Xiao-Shan Gao et al. "Complete solution classification for the perspective-three-point problem," in IEEE Transactions on Pattern Analysis and Machine Intelligence, vol. 25, No. 8, pp. 930-943, Aug. 2003.

\* cited by examiner

AUTOMATED KITCHEN SYSTEM FOR ASSISTING HUMAN WORKER PREPARE FOOD

CROSS-REFERENCE TO RELATED APPLICATIONS

This application claims priority to application No. 63/196,636, filed Jun. 3, 2021, entitled "AUTOMATED KITCHEN SYSTEM FOR ASSISTING HUMAN WORKER PREPARE FOOD."

BACKGROUND OF THE INVENTION

This invention relates to kitchen apparatuses to assist with preparing food, and in particular to apparatuses for assisting food preparation and cooking in a restaurant kitchen environment.

It is not uncommon for cooking errors to occur in the commercial kitchen or restaurant environment because many of the food preparation steps rely on the human worker. The human worker is responsible for many tasks including: recognizing each new order, identifying the food items and preparation steps necessary to complete the order, carrying out each of the steps to complete the order, timing each of the steps, and executing each of the above steps in parallel for multiple orders.

Depending on the skill level of the human worker, the number of orders at a time, and complexity of the recipes, a number of problems arise during the food preparation not the least of which is a lack of precision and consistency in the completed entrée. The human worker may forget to flip the steak or remove the steak weight at the precise time, resulting in an incorrect cooking level of the steak.

Another important shortcoming in a typical restaurant kitchen is inefficiency. Human workers are generally unskilled at carrying out multiple orders in parallel, and maximizing overall efficiency. On one hand, the human worker may have a sense or gut instinct based on experience to fill a grill with steaks for a dinner rush in order to accommodate the multiple orders, but doing so is prone to error, leading to food waste for those food items not used or alternatively, inadvertently missing an order. In either case, efficiency can be improved.

Consequently, there is still a need for improved systems for assisting human workers to prepare food in the kitchen environment.

SUMMARY OF THE INVENTION

A method for assisting a human worker with preparing food comprises aiming a combination of cameras or sensors at a food preparation area; inspecting the food preparation area using the sensors to obtain image data information; determining identity and position information of the food item or food preparation item based on the image data information from the inspecting step; and tracking the food item or food preparation item.

In embodiments, the method further comprises determining an output to command a robotic arm, instruct a kitchen worker, or otherwise assist in food preparation. In embodiments, the command is an instruction to perform a step in a food preparation process for an identified food item consistent with recipe information provided during set-up.

In embodiments, a plurality of the same types of sensors are aimed at the food items. In other embodiments, a combination of different types of sensors are aimed at the food items. The sensors can be selected from the group consisting of an infrared (IR) camera, an RGB camera, and a depth sensor at the food preparation area.

In embodiments, the method further comprises pre-processing the image data from the sensors prior to sending the image data to a trained model.

In embodiments, the image data from the sensors is transformed into a top perspective view of the grill.

In embodiments, the step of determining the identity and position information of the food item or food preparation item is performed using a trained neural network.

In embodiments, the step of tracking evaluates whether a food object is occluded, and updates the location of food objects that are not occluded.

In embodiments, the step of tracking computes a predicted location of the food object, and bases the computation of the predicted location on whether food object is stationary.

In embodiments, an automated kitchen assistant system comprises a plurality of sensors to inspect a food preparation area in the kitchen environment. The plurality of sensors may include a combination of the same or different types of sensors. In one embodiment, the sensors include a plurality of cameras operable to obtain image data of light in the visible spectrum wavelength range. In embodiments, the system further includes one or more processors to pre-process the image data to a common perspective view. The processor(s) is further operable to automatically recognize and provide location information for the at least one food item or food preparation item using the image data.

In embodiments, the combination of sensors further includes a third sensor which is a depth sensor and image data from the depth sensor is combined with the image data from the first and second sensor.

In embodiments, the image data from each of the sensors is made suitable to serve as an input layer for a single computer vision model (e.g., a CNN) capable of recognizing and providing location information for the at least one food item or food preparation item using the image data.

In embodiments, the image data from each of the cameras is transformed to another perspective (e.g., a top view of the grill) prior to inputting the information to the food item recognition model. Transforming the perspective from each of the cameras to a common view allows for use of one trained model, thereby increasing computing speed and efficiency.

In embodiments, the image data is transformed from the RGB space to the HSV space prior to inputting the information to the food item recognition model. Transforming to the HSV space has been found to improve detection of various cooking by-products or cooking by-matter that is not always readily detectable using only the RGB image data. Cooking by-products include matter that is created during the cooking process whether inadvertently, accidentally, or anticipated. Examples of cooking by-products include, without limitation, smoke, steam, fire, liquid drippings from cooking meats, and char on the grill.

In embodiments, the processor is operable to automatically recognize food objects in the food preparation area including food items, kitchen implements, a kitchen worker, or an appendage of a kitchen worker.

In embodiments, the processor employs a trained convolutional neural network to obtain identity and position information of the food item or food preparation item.

In embodiments, multiple processors are used to perform the various steps performed by the processor.

In embodiments, after the kitchen assistant has been set up including the aiming of the combination of sensors at the food preparation area and a calibration process, it can operate in an autonomous manner. In embodiments, the kitchen assistant is adapted to perform the steps of sensing, inspecting, determining identity and position information, tracking, and determining an output to command automatically and without human intervention or assistance. In embodiments, the kitchen assistant is further able to determine if a food preparation command has been performed and automatically determine a second food preparation command.

In embodiments instructions and information are be displayed on a tablet or monitor for the human worker to follow.

The description, objects and advantages of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

The following application are incorporated by reference in their entirety for all purposes: US Patent Publication No. 20200121125; US Patent Publication No. 20210030199; and US Patent Publication No. 20180345485.

Apparatus Overview

Figure 1A:
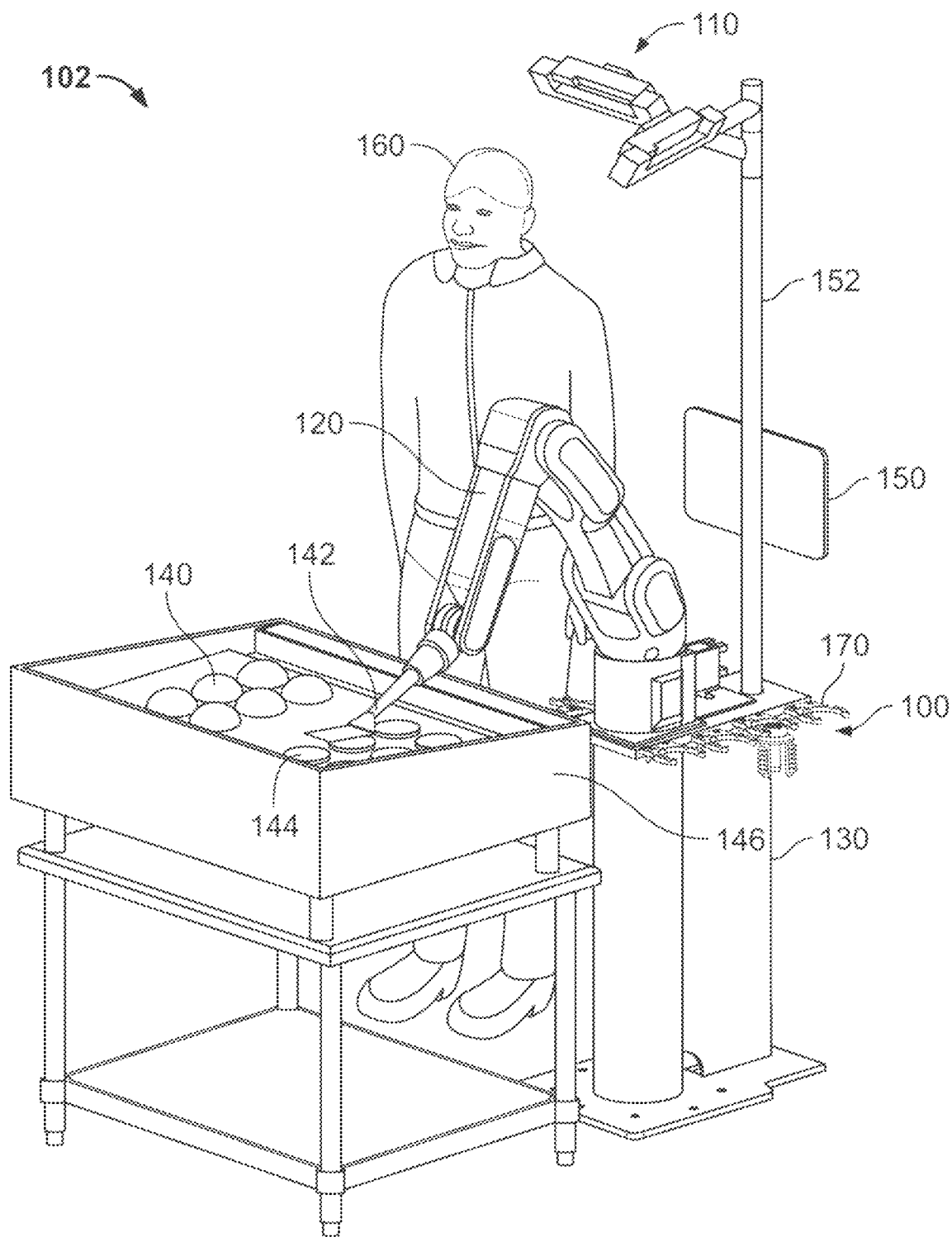
FIG. 1A illustrates an automated kitchen assistant system in a kitchen environment in accordance with an embodiment of the invention.

FIG. 1A is an illustration of an automated or robotic kitchen assistant system 100 in a kitchen environment 102 in accordance with one embodiment of the invention. By "kitchen environment", it is meant to include food preparation areas such as, for example, residential kitchens, commercial kitchens, restaurant kitchens, food stands, delicatessens, counters, tableside at restaurants, front of house at restaurants, food stands and mobile kitchens.

System 100 is shown having a plurality of sensors 110, a robotic arm 120, and an enclosure 130 for housing a processor and other hardware which are operable, as described further herein, to receive data from the sensors 110, process the data, and to recognize and locate the food 140, 144. Although food 140,144 are shown as a bun and burger respectively, it is to be understood that the types of food contemplated herein may vary widely. Examples of food items include, without limitation, meat, burgers, steaks, chicken, turkey, fish, pastries, baked goods, vegetables, potatoes, fries, pizza, seasonings, sauces, frostings, fruits, starches, water, oils and other ingredients or combinations thereof.

Additionally, in embodiments, the system 100 is operable to automatically control the robotic arm 120 to carry out one or more steps in preparing the food. FIG. 1A illustrates the system moving a spatula 142 to flip the burger 144 on a grill 146, but the invention is not so limited. A wide range of cooking or food preparation steps may be performed by the robotic arm including, without limitation, gathering, sorting, storing, washing, peeling, cutting, slicing, combining, mixing, grilling, sautéing, frying, boiling, baking, microwaving, broiling, placing, removing, braising, cooking, cooling, icing, seasoning, assembling, pouring and plating. The robotic kitchen assistant system may also be operable with a wide range of kitchen tools, appliances, equipment and dishware including, for example, plates, utensils, steak weights, pots, pans, baskets, stoves, cutting boards, dispensers, ovens, fryers, grills, microwaves, stovetops, mixers, refrigerators, freezers, slicers, and food processors (hereinafter referred to collectively as "kitchen implements").

Additionally, the motion and configuration of the robotic arm may vary widely. Examples of robotic arms, motion, training, and systems are shown and described in US Patent Publication No. 202001211253 to Zito; US Patent Publication No. 2017/0252922 to Levine et al.; and U.S. Pat. No. 9,785,911 to Galluzzo et al., each of which is incorporated by reference in its entirety.

FIG. 1A also shows a display 150 coupled to the frame 130 via a support 152. The display can be operable to interface with kitchen worker 160. An example of an interactive display is a tablet or touchscreen monitor. The kitchen worker may input information (for example, a modification to an order) with the user interface 150. Additionally, commands, alerts, and information may be provided to the kitchen worker on the display 150 or in some embodiments via speakers, a watch, or text message on a mobile phone.

In embodiments, the tablet is programmed with an application ("App") or otherwise to wirelessly or through a wired connection communicate with the processor, accept input from the user, and to send or display various information as described further herein.

The number and types of sensors 110 may vary widely. Examples of sensors include, without limitation, visible spectrum cameras (e.g., a black and white, or RGB camera), a depth sensors, and an infrared (IR) cameras.

In embodiments, the sensors include one or more visible spectrum cameras such as a RGB camera. Preferably, the RGB camera obtains an image comprising a 960 by 540 grid with intensity data for red, green, and blue portions of the spectrum for each pixel in the form of 8-bit unsigned integers. In embodiments, the focal length of the camera lens and orientation of the optics have been set such that area imaged includes the work surface. An exemplary visible spectrum sensor is the Kinect One sensor manufactured Microsoft Corporation (Redmond, Washington). In embodiments, a black and white visible spectrum camera is used.

The infrared or IR camera generates IR image data by measuring the intensity of infrared waves and providing data representing such measurements over the observed area. In embodiments, the focal length of the camera lens and orientation of the optics has been set such that area imaged includes the work area. Preferably, the IR camera is adapted to measure the intensity of IR waves (typically in the range of 7.2 to 13 microns, but other wavelengths in the IR may be used) over an area and generates IR image data. An exemplary IR sensor is the CompactPro high resolution thermal imaging camera manufactured by Seek Thermal Corporation (Santa Barbara, CA), which can provide an image of size 320×240 with each value a 16-bit unsigned integer representing measured IR intensity.

A depth sensor incorporates a time of flight (TOF) camera to generate data on the distance of each point in the field of view from the camera. The TOF camera is a range imaging camera system that resolves distance based on the known speed of light, measuring the time-of-flight of a light signal between the camera and the subject for each point of the image. In embodiments, the image comprises a 960 by 540 grid with a value of the distance from the sensor for each point in the form of a 16-bit unsigned integer. An exemplary depth sensor is the Kinect One sensor manufactured Microsoft Corporation (Redmond, Washington). In embodiments, other types of depth sensors are employed, such as devices using texturing (typically performed with an IR or near IR projector and two sensors) and stereo reconstruction, lidar, and stereoscopic cameras.

Without intending to be bound to theory, we have discovered the IR camera sensors providing IR image data have the potential to mitigate or overcome smoke, moisture, and other elements associated with conventional automated cooking equipment that reduce the quality of the image data. Due to the temperature differences typically present when an uncooked food is placed on a hot grill or other high temperature cooking surface or when a kitchen worker or kitchen worker's appendage is imaged against a predominantly room temperature background, IR camera sensors are able to provide high contrast and high signal-to-noise image data that is an important starting point for determining identity and location of kitchen objects, including food items, food preparation items and human workers. In contrast, the signal-to-noise ratio is significantly lower using only traditional RGB images than if using IR images. This occurs because some kitchen backgrounds, work surfaces, and cooking surfaces can be similar to food items in color, but temperatures are generally significantly different. Based on the foregoing, some embodiments of the invention include IR-camera sensors in combination with other types of sensors as described herein.

Figure 1B:
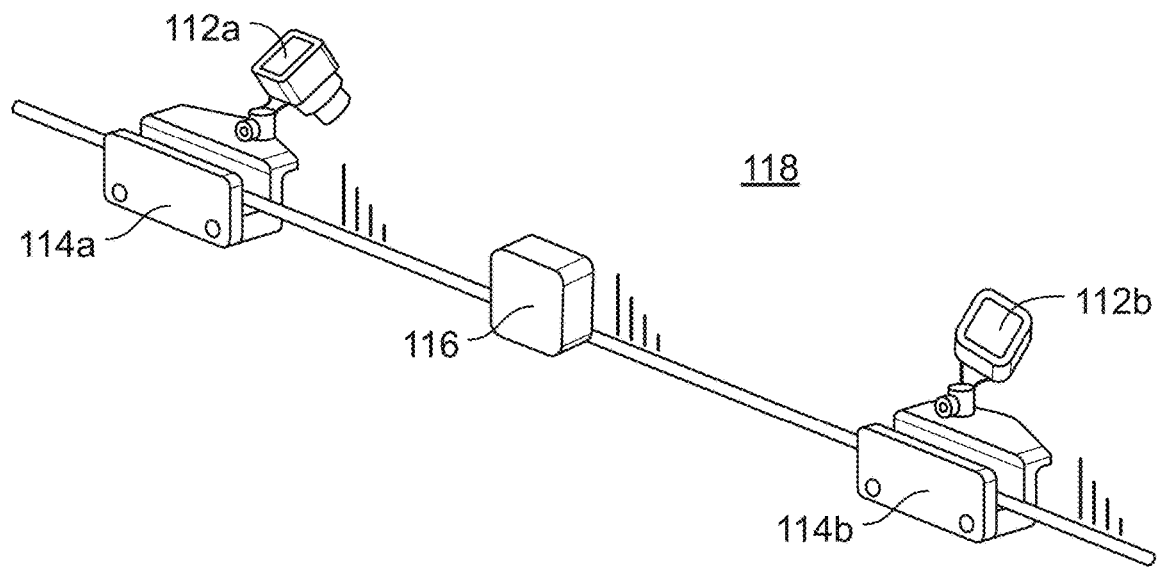
FIG. 1B illustrates another automated kitchen assistant system in a kitchen environment in accordance with an embodiment of the invention.

Optionally, and as shown in FIG. 1B, cameras 112a, 112b can be mounted on hood 118 or another structure normally present in the kitchen using, e.g., brackets 114a, 114b. The cameras are preferably mounted overhead the food to be prepared/cooked and preferably spaced apart by a distance ranging from 32 to 60 inches. The cameras 112a, 112b are aimed at the cooking surface from different angles or perspectives such that items in the cooking area are not obstructed by both cameras at the same time during normal cooking operations.

Figure 1C:
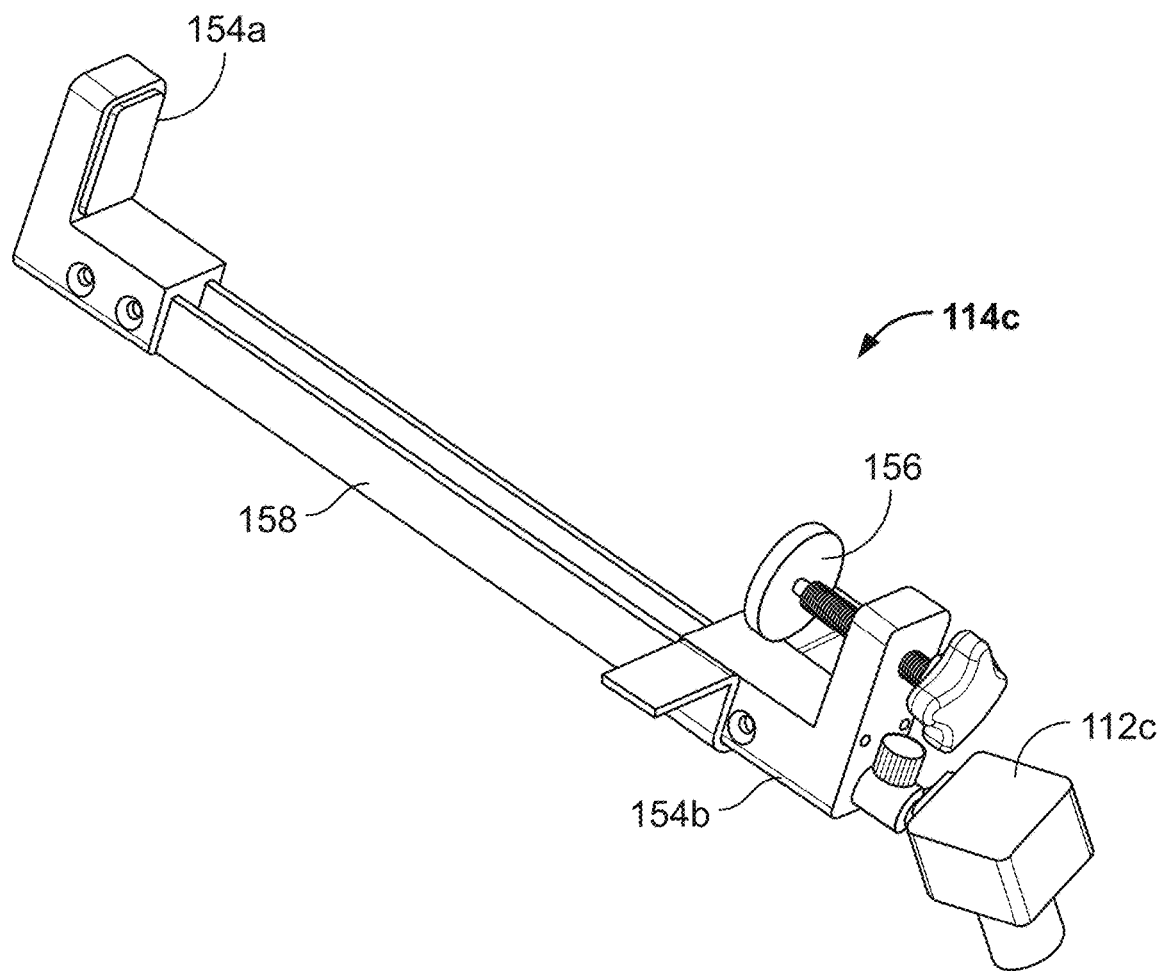
FIG. 1C is an enlarged perspective view of a camera mount in accordance with an embodiment of the invention.

FIG. 1C is an enlarged perspective view of a camera mount 114c to conveniently affix the camera 112c to the hood (not shown) in accordance with an embodiment of the invention. Mount 114c is shown including two fixed arms 154a, 154b separated by rigid body 158. Clamp member 156 extends from arm 154b and is adapted to be incrementally advanced by hand towards opposing arm 154a. In the embodiment shown in FIG. 1C, clamp member 156 includes an elongate threaded shaft and knob. When the mount 114c is arranged around a portion of the hood as shown in, for example, FIG. 1B, the clamp member 156 may be tightened to cause the jaw member 154a and clamp member 156 to sandwich the hood portion therebetween.

The embodiment shown in FIG. 1C also shows the camera 112c being pivotably and rotatably affixed to the arm 154b via thumbscrew lockable connection. Consequently, the operator may manually mount the camera to the hood and then adjust the camera to view a target area.

Optionally, and with reference again to FIG. 1B, a self-contained compact computer 116 can be mounted to the hood and is operable to communicate with the cameras and process the image data from cameras as described herein. An example of a computer is the Jetson® Nano™ Computer manufactured by NVIDIA Corporation (Santa Clara, California). A wide variety of types of information may be computed and displayed to the human worker as described further herein.

Optionally, each camera may be attached to a computer which is operable to communicate with other computers to compute and display information.

Figure 2:
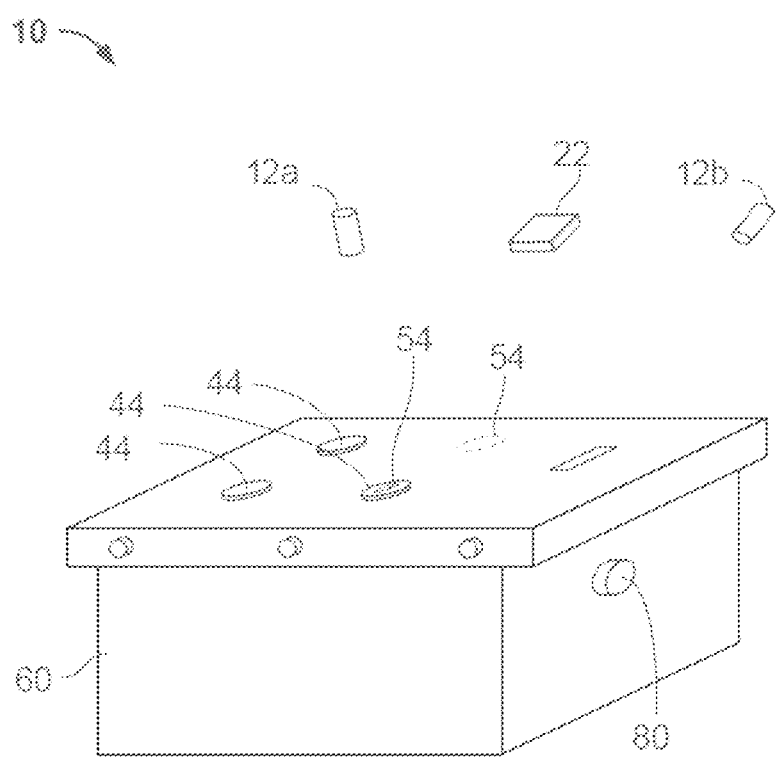
FIG. 2 illustrates another automated kitchen assistant system in a kitchen environment in accordance with an embodiment of the invention.

FIG. 2 depicts an overview of another robotic kitchen assistant system 10 in accordance with an embodiment of the invention including: a commercial grill 60 (with the hood removed for clarity), cameras 12a, 12b for visual recognition, an optical or laser projection system 22, various food items 44, and viewable instructions 54 projected by the projection system onto the food items or onto the commercial grill 60 as desired. Additional components or features can be included (or operate) with the food preparation system (not shown) including but are not limited to: a computer for processing information, an Internet connection, a point of sale system, a kitchen display system (KDS), local and remote server(s), and a human worker to read the instructions and act accordingly. The cameras, computer, and/or projector may be mounted to a hood (not shown), ceiling, or other equipment present in the kitchen or can be carried on a standalone support 152 as described above in connection with FIG. 1A.

In preferred embodiments, the food preparation system takes or receives orders from a system that collects customer orders, and then, as described further herein, projects meaningful visual information onto the work areas (either directly with projected light, for instance, or virtually with AR glasses) to help guide kitchen workers in the preparation of food items. The food preparation system is operable to determine which instructions to project (and when and where to project the instructions) based on various types of information including knowledge of the current state of the grill, status of food items being prepared, information collected by cameras and other sensors, recipes for various food items, past orders, and other information. In embodiments, the system automatically monitors the work area for evidence that the step has been completed and then projects a next step. A wide variety of augmented reality systems may be incorporated into the system including use of AR-style goggles in which case a beacon 80 serves to assist with location or registration information. Although the beacon 80 is shown affixed to the side of the grill in FIG. 2, in embodiments, the beacon is located at other locations more visible to the human worker such as, for example, the front of the hood or adjacent the knobs of the grill. Examples of AR system are described in for example US Publication No. US Patent Publication No. 20210030199, incorporated herein by reference in its entirety.

Figure 3A:
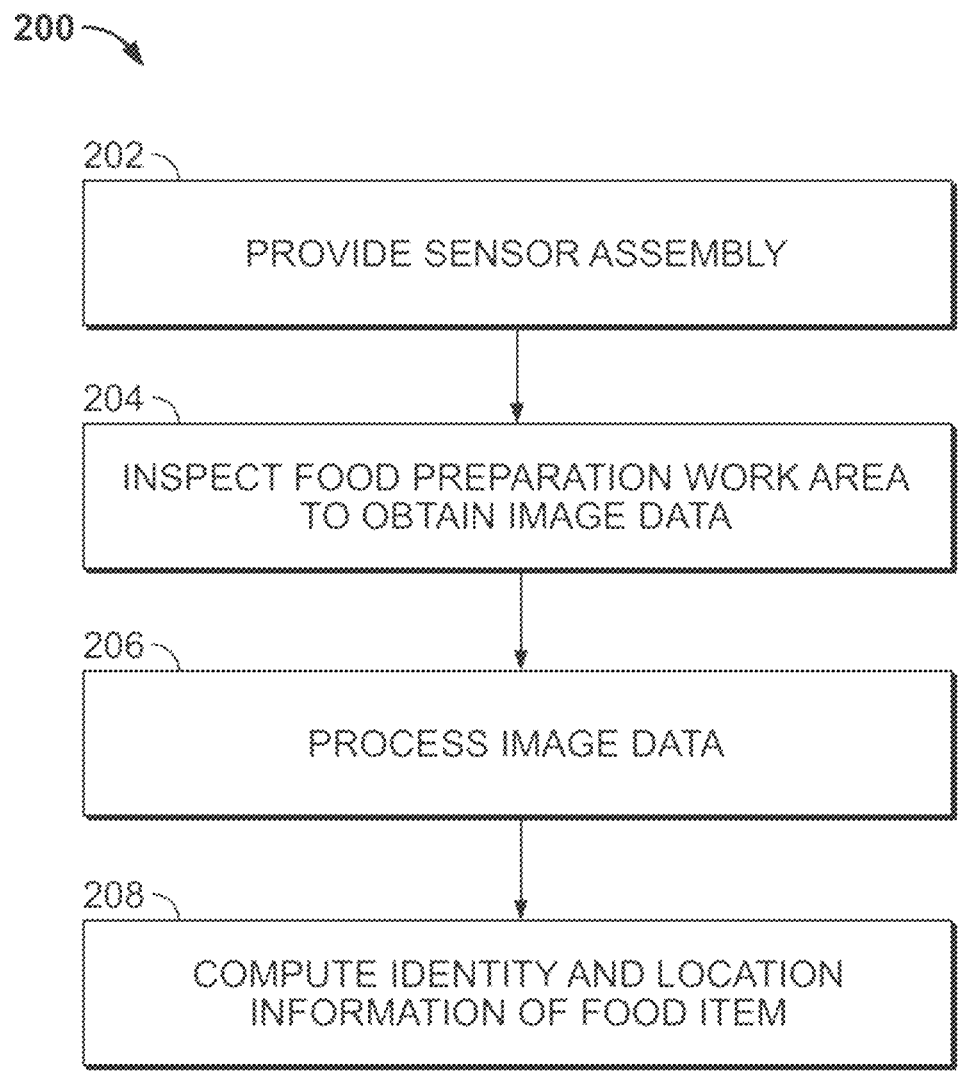
FIG. 3A is a flow diagram of a method for recognizing a type of food.

FIG. 3A represents a general overview of a method 200 for recognizing a food item in accordance with one embodiment of the invention.

Step 202 states to provide a sensor assembly. The sensor assembly may include a plurality of sensors, at least one of which is an RGB or IR camera as described herein. In embodiments, and as shown in FIGS. 1A-1C, the sensors are provided by installing sensors above the cooking worksurface. In FIGS. 1A-1C, the sensors 110 are shown being aimed at the food and working surface.

In embodiments, cameras are installed above and lateral of the target cooking area in order to obtain opposing top side perspective views of the cooking area. Obtaining images from opposing side angles of the cooking area reduces or eliminates the risk of failing to track an object in the cooking area due to obstruction of vision from human workers and other obstructions.

Step 204 states to inspect the food preparation work area to obtain sensor image data. As described further herein, in embodiments, the sensors generate data in the form of image data of an area.

Step 206 states to process the image data from the sensors. In embodiments the image data may be processed to reduce noise, crop size, adjust contrast, etc. Additionally, as described herein, the image data from different cameras or perspectives may be transformed into a single perspective view, preferably a top view of the grill.

Step 208 states to compute identity and location information of the food item or food preparation item. As described further herein, the image data is input to a model, engine, or module such as a trained convolutional neural network or another means for object recognition and tracking. In embodiments, a probability of the identity and area within which the food item or food preparation item is located is computed by a Kitchen Scene Understanding Engine.

It is to be understood that in addition to identifying and locating food, step 208 is equally applicable to identify and locate kitchen implements, and other objects detected by the sensors such as, without limitation, the kitchen worker or a part of the kitchen worker, such as his hand. Additionally, by "food preparation items" it is meant to include kitchen worker, or a portion of the kitchen worker, robot, or a portion of the robot, and kitchen implements including, without limitation, appliances, dishware, and tools used in the preparation of food. Additionally, by "kitchen object" it is meant to include either a food item or food preparation item.

Optionally, and as discussed further herein, the identity and location information may be used to instruct a human worker, control a robotic arm or otherwise carry out a desired food preparation step, such as for example, turning on an appliance. Optionally, the control of the robotic arm is done autonomously or automatically, namely, without human instruction to carry out particular movements.

Figure 3B:
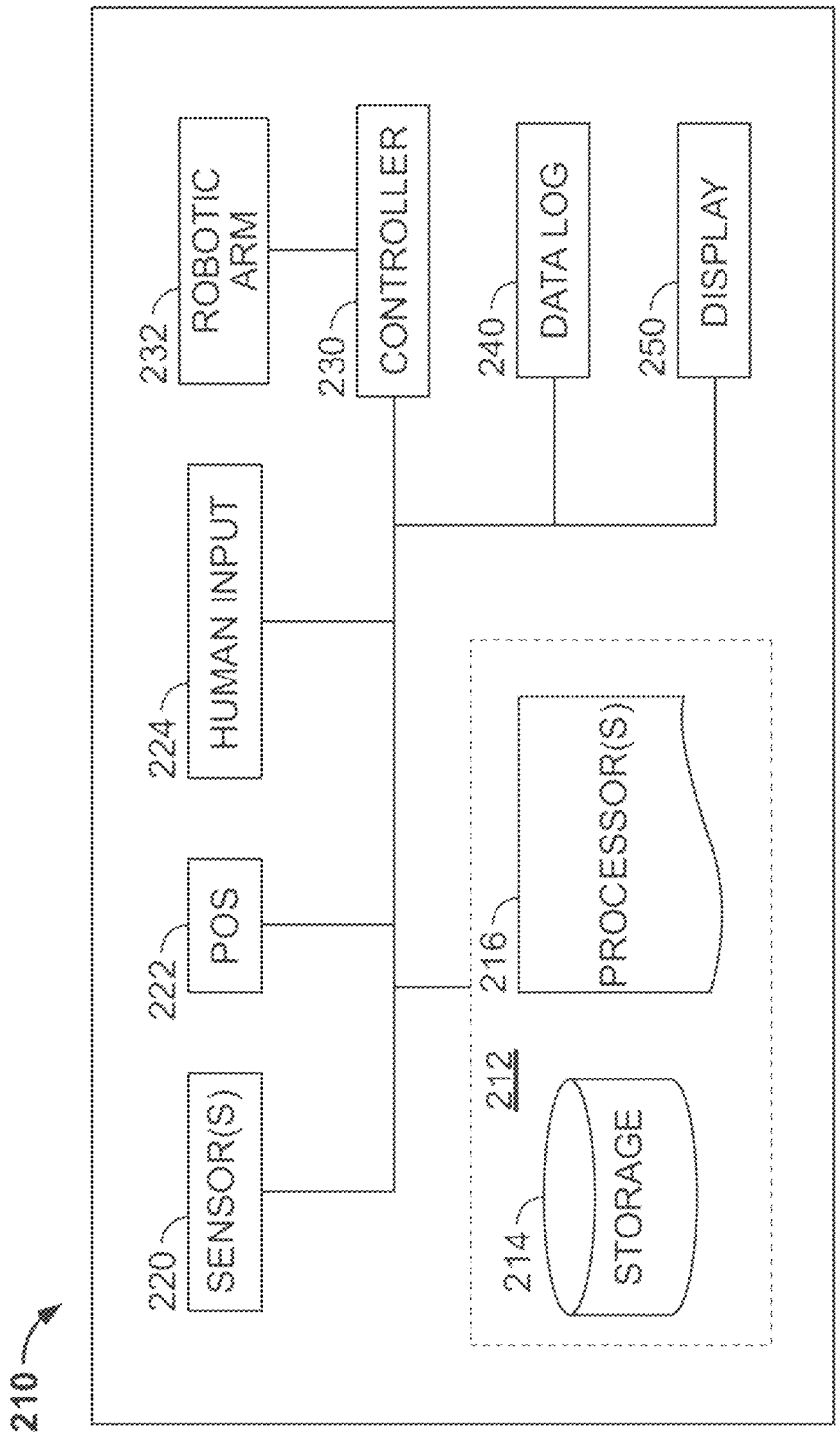
FIG. 3B schematically depicts an example architecture of an automated kitchen assistant system.

FIG. 3B schematically depicts an example architecture 210 of an automated kitchen assistant system. Particularly, a computer, workstation, or server (each of which is represented by reference numeral 212) is shown comprising storage 214, and a processor 216 (e.g., a CPU and in some cases a GPU). In embodiments, one or more processors may be used to perform the functions and steps described herein. In some embodiments, multiple CPUs or GPUs may be used.

The computer 212 is shown connected to sensors 220, restaurant's point of sale (POS) system 222, human input device 224, display 250, and data log 240. Optionally, the system can have robotic arm 232 and dedicated controller 230 for the robotic arm.

Additionally, in embodiments, one component or device may serve more than one function in the system such as, for example, a tablet in which case the tablet can be programmed to serve as a display 240 and an input device 224. Instructions, alerts, status, orders, inventory, and other types of information may be shown to the human worker. Inputs may be accepted by the tablet or input device including over-ride commands, cook level, recipe or cooking adjustments, cook time adjustments, etc.

In embodiments, one or more of the components are remote and connected to the other components of the robotic kitchen assistant system via the Internet or other type of communication channel. For example, computer 212 may communicate with a remote (e.g., cloud-based) server to exchange data, recipes, cooking equipment specifications, provide software updates, send commands, backup local storage, and carry out one or more of the modules described herein.

Figure 3C:
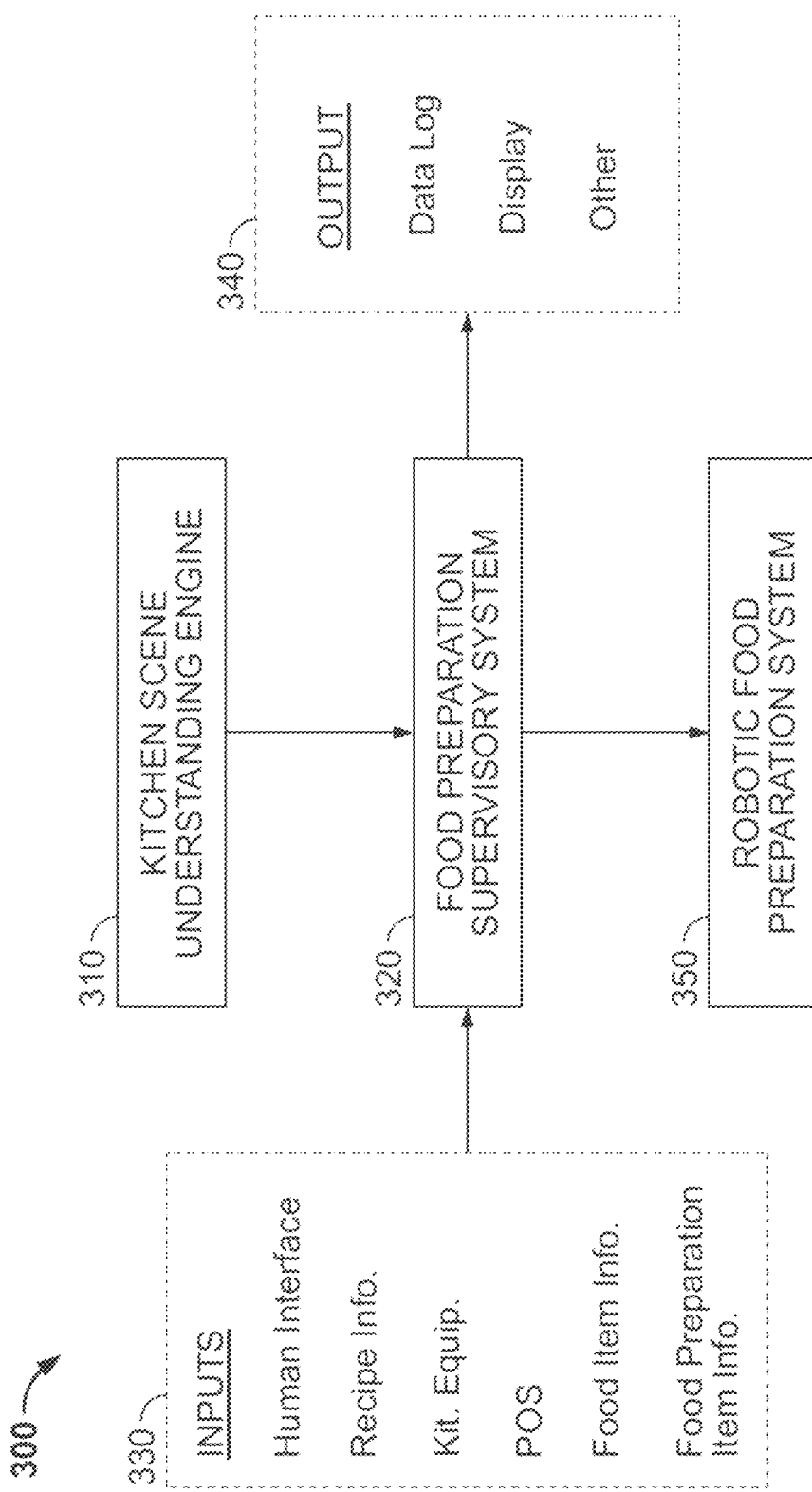
FIG. 3C depicts a software module of an automated kitchen assistant system in accordance with embodiments of the invention.

FIG. 3C depicts various software modules or engines 300 of an automated kitchen assistant system in accordance with an embodiment of the invention. Particularly, FIG. 3C shows additional detail on the cooperation between the Kitchen Scene Understanding Engine 310, the Food Preparation Supervisory System 320, Input 330, Output 340, and the Robotic Food Preparation System 350.

In embodiments, the Kitchen Scene Understanding Engine 310 serves to detect and track all relevant objects in the work area, including but not limited to food items, kitchen implements, and human workers or parts thereof. Data on these objects including but not limited to their identity and location are provided to the Food Preparation Supervisory System 320, which generates the instructions for preparing the food item. These instructions are provided to either or both the Robotic Food Preparation System 350 and to the human worker. Instructions may be provided to the human worker by, for example, display. In embodiments, the display is a touch screen tablet or another device adapted to receive input and display information with the human worker.

In some embodiments, the Food Preparation Supervisory System 320 determines the presence of new food preparation items (based on, amongst other things, data from the kitchen scene understanding engine 310) and automatically begins the food preparation process. In some embodiments, the Food Preparation Supervisory Systems 320 is operable to (a) instruct a human worker via the display (or otherwise) to retrieve raw ingredients from nearby cold or dry storage based on an order received from the restaurant's POS system, flip a food item, place or remove a food item, or, (b) in the case a robotic arm is present, to signal the Robotic Food Preparation System 350 to control the robot arm to carry out a food preparation or cooking step.

In embodiments, once the appropriate food preparation item is recognized by the Kitchen Scene Understanding Engine 310, the Food Preparation Supervisory System 320 begins the food preparation process for that item. For example, in embodiments, the processor is operable to use recipe data to select actions and to: (a) instruct the human worker to perform a task by displaying information on the display or, in the case the system includes a robotic arm, (b) send information to a controller to generate motion by the robot arm that manipulates the food on the work surface.

The Food Preparation Supervisory System 320 shown in FIG. 3C has access to a wide range of inputs 330 including, without limitation, recipe data, inventory of kitchen implements including their specifications, information on food items, information on food preparation items, and orders from the restaurant's point of sale (POS) system. Examples of means to provide inputs 330 to the Food Preparatory Supervisory System 320 includes a human interface such as a tablet or keyboard, a locally connected drive or server, a restaurant or vendor's customized software system, or an internet connected server.

Figure 4:
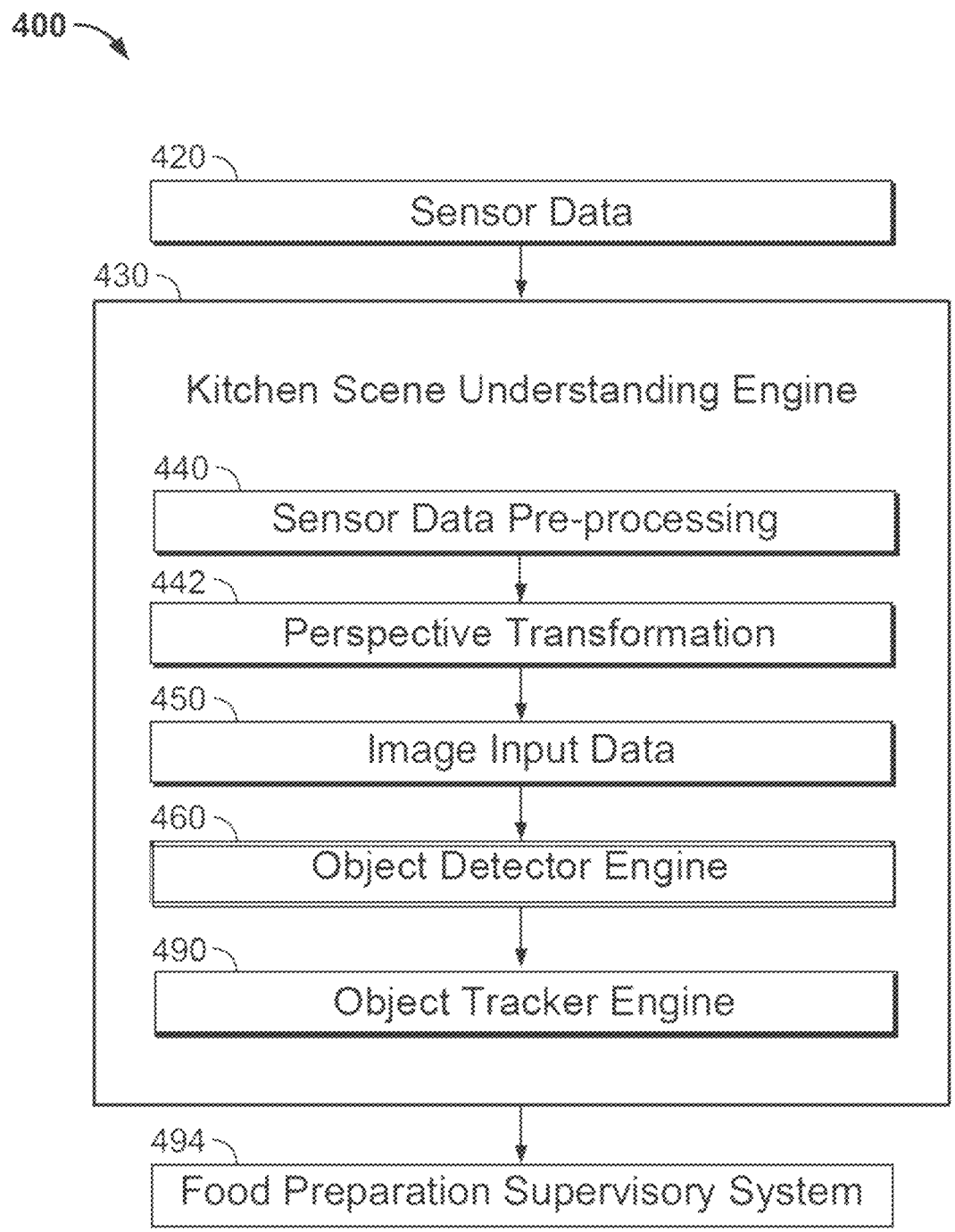
FIG. 4 is a flow diagram of a method for recognizing and preparing food items.

FIG. 4 is a flow diagram showing additional detail on the Kitchen Scene Understanding Engine 430 and its cooperation with other modules of the robotic kitchen assistant system 400. Particularly, sensor image data 420, including image data from a plurality of cameras arising from viewing objects in the kitchen environment, is provided to the kitchen scene understanding engine 430.

Step 440 states to pre-process the sensor image data 420. Non-limiting examples of types of pre-processing include adjusting image size, contrast, aligning or registering, and reducing noise.

Step 442 states to perform a perspective transformation (e.g., overhead perspective transformation) of the image data from the various sensors. A perspective transformation serves to simplify the training and use of the CNN, discussed herein. For example, by transforming the upper side view to a top view of the grill, the view of the target area is normalized regardless of where the sensor is mounted or aimed. One model can thus be trained for multiple cameras placed at different angles and locations with respect to the cooking area.

It is to be understood the number of cameras or sensors may vary. Additionally, the types of cameras or sensors may vary. In one embodiment, the system comprises two cameras for capturing images of light having wavelengths in the visible spectrum. In another embodiment, the system comprises RGB, depth, and IR sensors, wherein the RGB and depth data are preferably transformed into the IR reference frame to make up the input layer to the CNN, discussed herein.

The modified image data 450 is sent to object detector engine 460. In embodiments, the object detector engine 460 is a trained convolutional neural network (CNN) such as RetinaNet with ResNet-18. See, e.g., Lin, Tsung-Yi, et al. "Focal loss for dense object detection." Proceedings of the IEEE international conference on computer vision. 2017. However, it is to be understood that the invention is not so limited and the type of object detector may vary. In embodiments, the object detector is a combination of a region proposal network and CNN. An example of region proposal network and CNN is described in Shaoqing Ren, Kaiming He, Ross Girshick, and Jian Sun, "Faster R-CNN: Towards Real-Time Object Detection with Region Proposal Networks Faster", IEEE Transactions on Pattern Analysis and Machine Intelligence, Volume 39 Issue 6, June 2017, which is hereby incorporated by reference in its entirety. Examples of other types of convolutional neural networks are described in Patent Publication Nos. US 20170169315 entitled "Deeply learned convolutional neural networks (CNNs) for object localization and classification"; 20170206431 entitled "Object detection and classification in images", and U.S. Pat. No. 9,542,621 entitled "Spatial pyramid pooling networks for image processing", each of which is herein incorporated by reference in its entirety.

In embodiments, the object detector is trained to identify food items and food preparation items, kitchen items, and other objects as may be necessary for the preparation of food items. Such items include but are not limited to human workers, kitchen implements, cooking by-products, and food.

For each set of image input data provided as an input layer to the object detector 460, the object detector outputs the location in the image data and associated confidence levels for objects it has been trained to recognize. In embodiments, the object detector 460 outputs location data in the form of a "bounding box" in the image data defined by two corners of a rectangle. The output also includes a prediction of the class identity of the object.

In embodiments, multiple data pipelines are executed in parallel corresponding to the number of cameras or sensors. In embodiments, first and second data pipelines are generated in which the trained detector outputs a first and second output layer corresponding to each of the first and second cameras.

Optionally, the accuracy of the object's location within the CNN output layer may be further computed. For example, IR image data measured within the area defined by the bounding box taken from the CNN output layer is further processed to more accurately determine an object's location. Techniques to do so include various computer vision and segmentation algorithms known in the art such as Ohta et al. "Color information for region segmentation." Computer graphics and image processing 13.3 (1980): 222-241; and Beucher, Serge, and Fernand Meyer. "The morphological approach to segmentation: the watershed transformation." Optical Engineering-New York-Marcel Dekker Incorporated-34 (1992): 433-433.

In a preferred embodiment, the processor is programmed to compare or aggregate the output of the detector (e.g., CNN output) from each of the first and second detection pipelines for the presence of a food item. In some cases, the highest confidence score for class identity is used. The confidence of classification of an object is the belief that the object is indeed the measured class. In embodiments, detections are filtered out that are below a certain confidence threshold value. In preferred embodiments, detections that are below 90% confidence are filtered out.

Aggregating the output data of the detector model may be performed in various manners including, for example, selecting the highest confidence score for each detected food item (or deleting the lower confidence score). Collecting image data from multiple cameras arranged at different perspective views of the working area provides additional (sometimes redundant) information of the scene to enable robust tracking, discussed herein, and minimizes false negatives arising from worker obstructions.

In another embodiment, the system designates a primary camera or pipeline, and a second or ancillary camera to confirm or correct the confidence level of a food item determined from the first camera data. As discussed herein the cameras are preferably placed above the grill, and are laterally spaced from one another to obtain upper side perspective views of the entire grill. Consequently, food items on the grill are visible by at least one of the cameras.

Next and with reference to FIG. 4 again, the object tracker engine 490 takes the measurements of the food object from the object detector 494 and updates the location of the food object. For example, in embodiments of the invention, steaks and steak weights are tracked as the steaks are cooked on the grill. The object tracker maintains the status, location, and identity of the each of the food objects in the working area.

Optionally, the location data of the identified objects given in the two dimensional coordinate system from the tracker can be translated into a three dimensional coordinate system such as a world coordinate frame or system reference frame. In embodiments, and when a robotic arm is present, the world coordinate frame is the same frame used by the robotic arm. However, in other embodiments, the 3D transformation is not necessary. For example, when only a 2D view of the food items is desired for observation or providing instructions to a human worker, the 3D transformation can be eliminated.

FIG. 4 also shows food preparation supervisory system 494 receiving the output of the kitchen scene understanding engine, and in particular, receiving the output from the object tracker 490. As discussed herein the food preparation supervisory system 494 computes instructions to present to the human worker or to control the robot to assist with preparing the food.

Figure 5A:
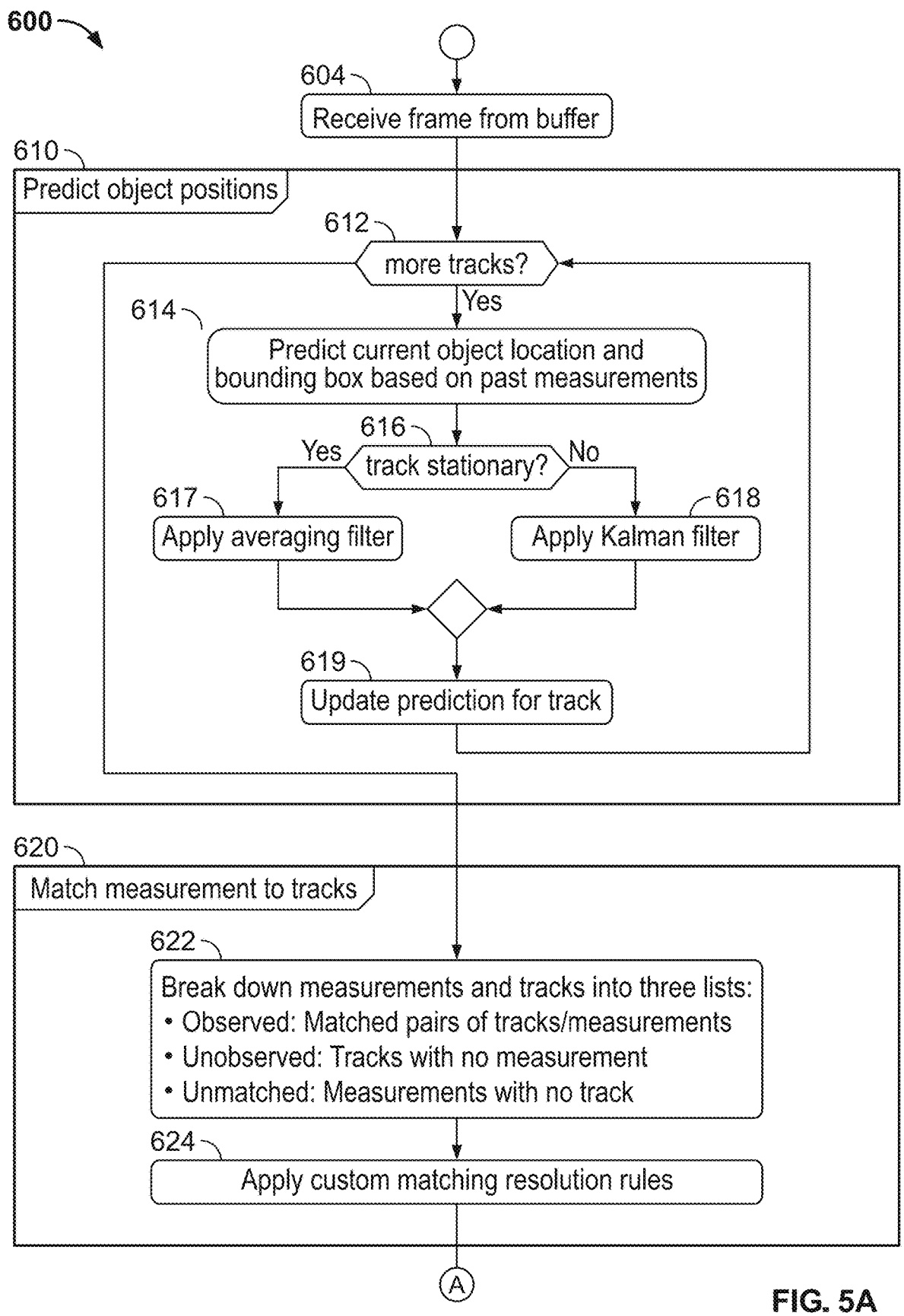
FIG. 5A is a flow diagram of a method for tracking food items in accordance with embodiments of the invention.
Figure 5A:
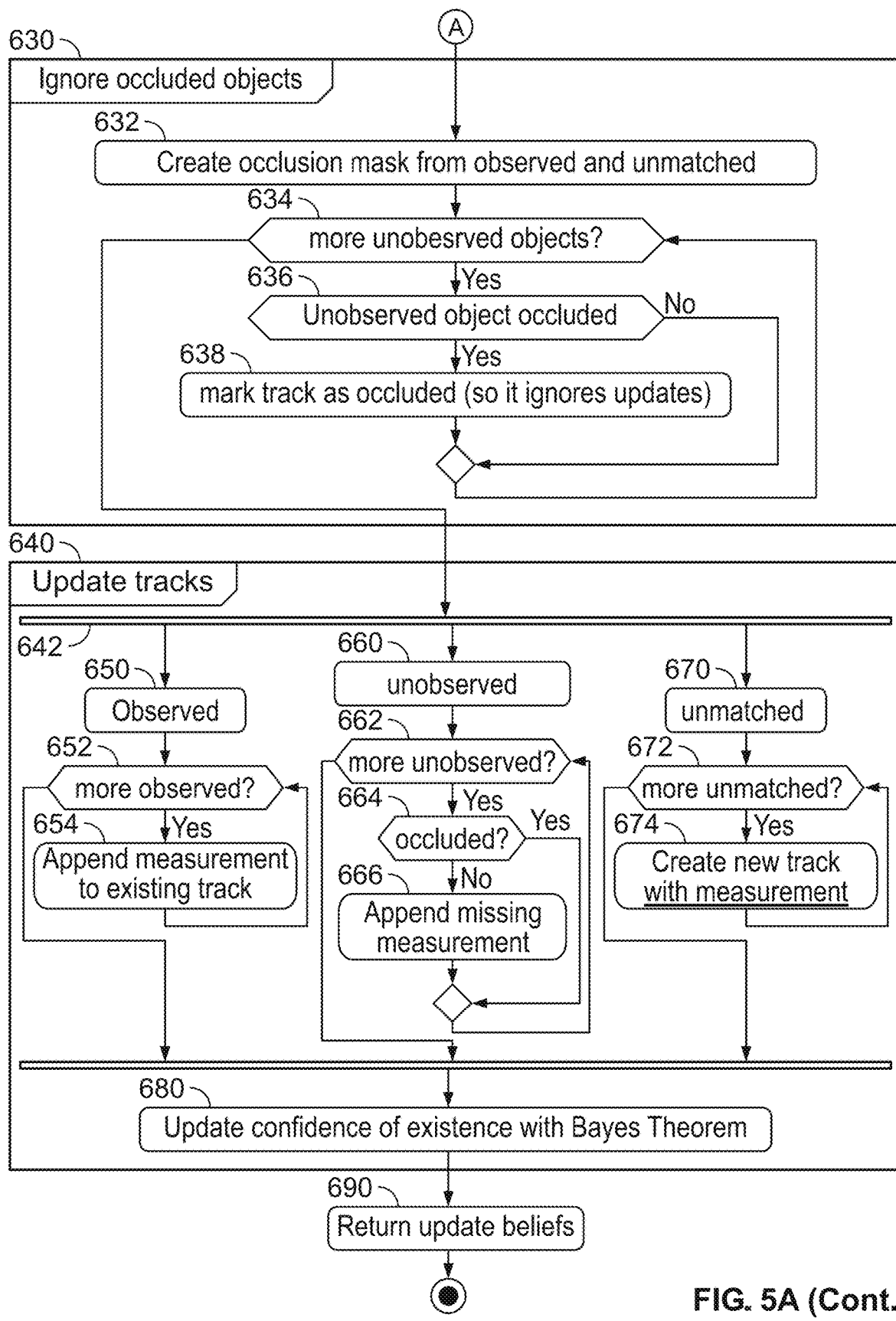

FIG. 5A is a detailed flow diagram of an object tracking process 600 in accordance with an embodiment of the invention.

Initially, an object prediction module 610 calculates a predicted object position. With reference to step 614, the object prediction module computes the object's current position (e.g., a bounding box) based on past measurements of the object for each frame received from the buffer (step 604). By "frame" it is meant a set of measurements all taken at a specified point in time. For a video stream, for example, an image is a frame (the pixels are the individual measurements). However, in preferred embodiments of the invention, a frame is a list of bounding boxes with associated class identity. In embodiments, each frame has a header which contains a timestamp and (monotonically incrementing) sequence number. Examples of algorithms/techniques to predict the current position are described in Simon, Dan. "Kalman filtering." Embedded systems programming 14.6 (2001): 72-79.

Step 616 queries whether the object is stationary. If the object is stationary, a first type of filter (step 617) is applied (e.g., the measurements may be averaged). If the object is not stationary, a second type of filter (step 618) is applied (e.g., a Kalman type of filter may be applied). A Kalman filter is an algorithm for improving signal tracking. A Kalman filter generally includes a physical model of an object and uses the physical model to predict the next measurement (e.g., to where did the object move). Examples of types of Kalman filters that can be used in embodiments of the invention include, without limitation, the Extended Kalman Filter and the Unscented Kalman Filter. Without intending to being bound to theory, Applicant has found adding a step for querying whether the object is stationary, and applying stationary-based filters increases computing efficiency, and especially for tracking numerous objects as is the case in the kitchen working areas. Indeed, a large grill may have upwards to 50 burgers or steaks and other food items at one time. Applying different types of filters for predicting tracks enables use of a fast type filter on a substantial number of the objects. A more comprehensive and relatively slow filter can be applied to the moving objects without sacrificing computer power or time. Notwithstanding the above, it is to be understood a wide variety of types of filters may be applied in embodiments of the invention and the invention is intended to be limited only as recited in any appended claims.

Step 619 states to update the predicated location for the track. By "track" it is meant a list of measurements over time that correspond to a distinct object. A track is typically created when a measurement is found that doesn't represent any known object.

If another track is present, the object prediction sub-module repeats, returning to step 614. If another track does not exist, the updated prediction for the track computed in step 619 is sent for matching, described herein.

Sub-module 620 evaluates whether a track matches with current measurements. Particularly, step 622 evaluates each track for a match with a current measurement and separates the results into a plurality of categories including: observed, unobserved, and unmatched. By "observed", it is meant matched pairs of tracks/measurements. By "unobserved", it is meant tracks with no measurements. By "unmatched", it is meant measurements with no track.

Optionally, and with reference to step 624, one or more custom matching resolution rules are applied. For example, if a steak weight is detected on the grill, and a steak is not detected, assume a steak is present under the steak weight, at least for the purposes of cooking. This type of custom rule provides a uniform way of adding known structure to the tracking algorithm to improve tracking accuracy.

Sub-module 630 is an occlusion mask module and states to ignore occluded objects. Marking objects as occluded is important during the tracking process because the objects may in fact be present but not observed. Objects may not be observed because something (e.g., the human worker) is between the camera and object being tracked. Without accounting for occlusion, a false negative may be generated.

To account for the unobserved object, and with reference to step 632, an occlusion mask is created from the observed objects and the unmatched objects. For example, a mask may be created for (1) a steak weight which may have measurements and a matching track and (2) a human worker or portion of the human worker which may have measurements unmatched to a track. In embodiments, an occlusion mask comprises an image mask data set where each pixel in the mask image has a binary value of 1 or 0. The value of '1' is assigned to each pixel in the image where the occluding object is not present. The value of '0' is assigned to each pixel in the image where the object is present. This mask often has a coarser resolution than the image to which it applies.

Next, with reference to steps 636, each unobserved object is evaluated for whether it is occluded based on the occlusion mask computed in the steps described above.

If the unobserved object is deemed occluded, step 638 marks the track as occluded and is not updated. Otherwise, the process continues to the next track update sub-module 640, described herein.

The track update sub-module 640 serves to update each track according to its category: observed, unobserved, and unmatched.

As described above, the observed category 650 includes tracks matched with the current measurement. The current measurement is appended to the existing track according to step 654 before proceeding to updating the confidence of existence in step 680, discussed herein.

The unobserved category 660 includes tracks not matched to a current measurement. Step 664 queries whether the tracked object is occluded. If the tracked object is occluded, the current measurement is ignored and the process proceeds to step 680 for updating the confidence of existence, discussed herein. If the track is not occluded, the missing measurement is appended to the track per step 666 before proceeding to step 680 to update the confidence level.

The unmatched category 670 includes measured objects lacking tracks. For this category, a new track is created for the current measurement according to step 674. Then, the track and measurement are sent for updating the confidence of existence according to step 680, discussed herein.

Step 680 states to update the confidence of existence. The confidence of existence of an object is the probability that the object exists. With each observation, the confidence increases. Conversely, with each missed observation, the confidence decreases. In the case of an occluded object (and especially where the occluded objects are stationary such as a steak under a steak weight), the confidence level for the occluded object should not degrade for a missed observation because the object was merely occluded.

Figure 5B:
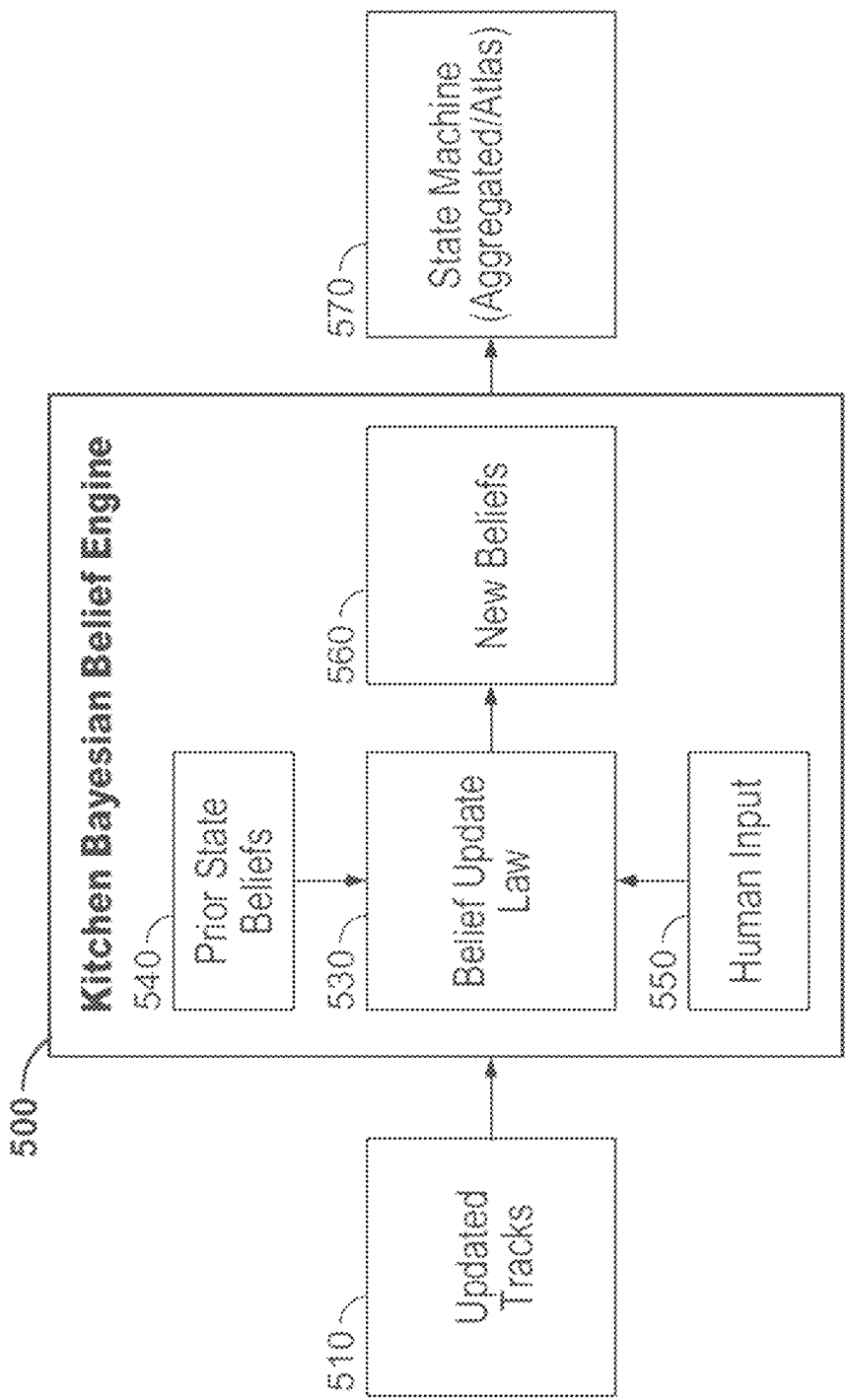
FIG. 5B is a block diagram of various computing modules for aggregating location of and classification information of food items in accordance with embodiments of the invention.

A wide variety of algorithms may be employed to compute the probability based on the prior conditions including, for example, Bayes' Theorem. With reference to FIG. 5B, a detailed view of a Kitchen Bayesian Belief Engine (KBBE) 500 is shown in accordance with an embodiment of the invention. Belief update law 530 receives updated tracks 510 and evaluates the observations in the context of the system's prior beliefs 540 as well as any human input 550 that may have been supplied. An example of the system's prior beliefs 540 may include the object classification, confidence level of existence, time count per side, location, and total time per object. Examples of human inputs 550 may include cook level, class of food (e.g., steak, burger, chicken fillet, fish fillet, onions, bun, etc.), size, cut (e.g., filet, ribeye, patty, chicken breast, etc.), system overrides (e.g., custom time, emergency stop), etc.

The output of the belief update rules or law is a set of new or updated beliefs 560.

The updated new beliefs are shown being sent to a state machine 570. The state machine 570 or finite state machine is a model of computation. The state machine maintains state variables to keep track of the environment and whatever else is necessary for the system to perform the necessary functionality (e.g., how long has a steak been cooking). In addition, a state machine can have a transition function which updates the state based on the previous state and new inputs (e.g., a frame of measurements from the detector). The state machine includes identity and location of all known objects in the observation area. It includes an atlas or aggregated set of information on the types of food, kitchen implements, time counts, and workers within the work space. An example of a final set of beliefs can be represented as a list of objects that are believed to exist with associated classification confidences, time counts, and location estimates. As described above, the aggregated set of food items and or kitchen objects can be used by the Food Supervisory System to calculate instructions and commands, described herein.

Food Preparation Supervisory System

With reference again to FIG. 4, step 494 states food preparation supervisory system. As described herein, the food preparation supervisory system is operable to compute a variety of instructions or commands for food preparation and cooking including, for example, to determine when a set amount of time has passed for a particular food item or side for food item, and to determine the next step in the cooking process.

In embodiments, the food preparation supervisory system automatically determines the set time based on the type of food item and cook level selected by the human worker or order, discussed further below.

The food preparation supervisory system 494 then sends a command or instruction to the display or another device (e.g., audio, optical projection, etc.) to communicate with the human worker or, in the case of preparing the food using a robotic arm, the food preparation supervisory system sends a signal to the controller to cause the robotic arm to carry out the applicable step. An example of a next step is to remove the food item from the grill, to flip the food item, or to place or remove a utensil such as a steak weight from the food item on the grill.

CNN Detail

Figure 6:
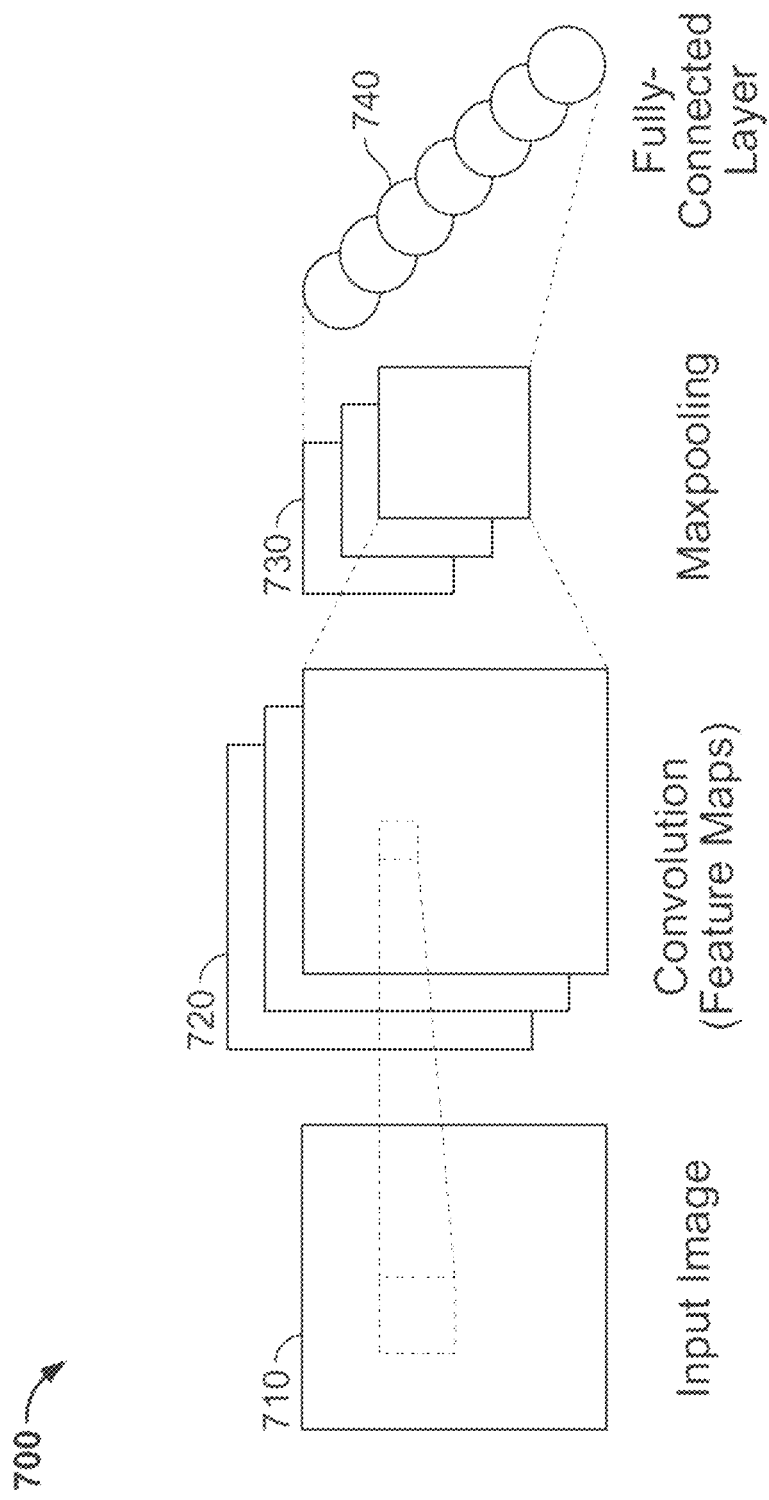
FIG. 6 schematically depicts an example architecture of a convolutional neural network.

With reference to FIG. 6, embodiments of the invention employ a trained CNN 700 to compute the identity and location of the food item or kitchen preparation item based on the input image (e.g., a top view of the grill showing the various food item and food utensils). Particularly, FIG. 6 shows input image 710 serving as the input layer to the convolutional layers 720, max pooling layer 730, and fully connected layer 740. In embodiments, the CNN is a region proposal network and Fast R-CNN.

In embodiments, the output layer of the CNN is the prediction vector which gives the objects recognized by the CNN, along with a confidence level (e.g., from zero to one), and their location in the two-dimensional image data. In embodiments, the location is characterized using a bounding box and denoting two corner points of the bounding box in the image plane.

The length of the output vector is equal to the number of objects that the CNN has been trained to identify. In embodiments, the length of the output vector ranges from 1 to 500, preferably from 50 to 200, and most preferably from 75 to 125.

Training the CNN

Figure 7:
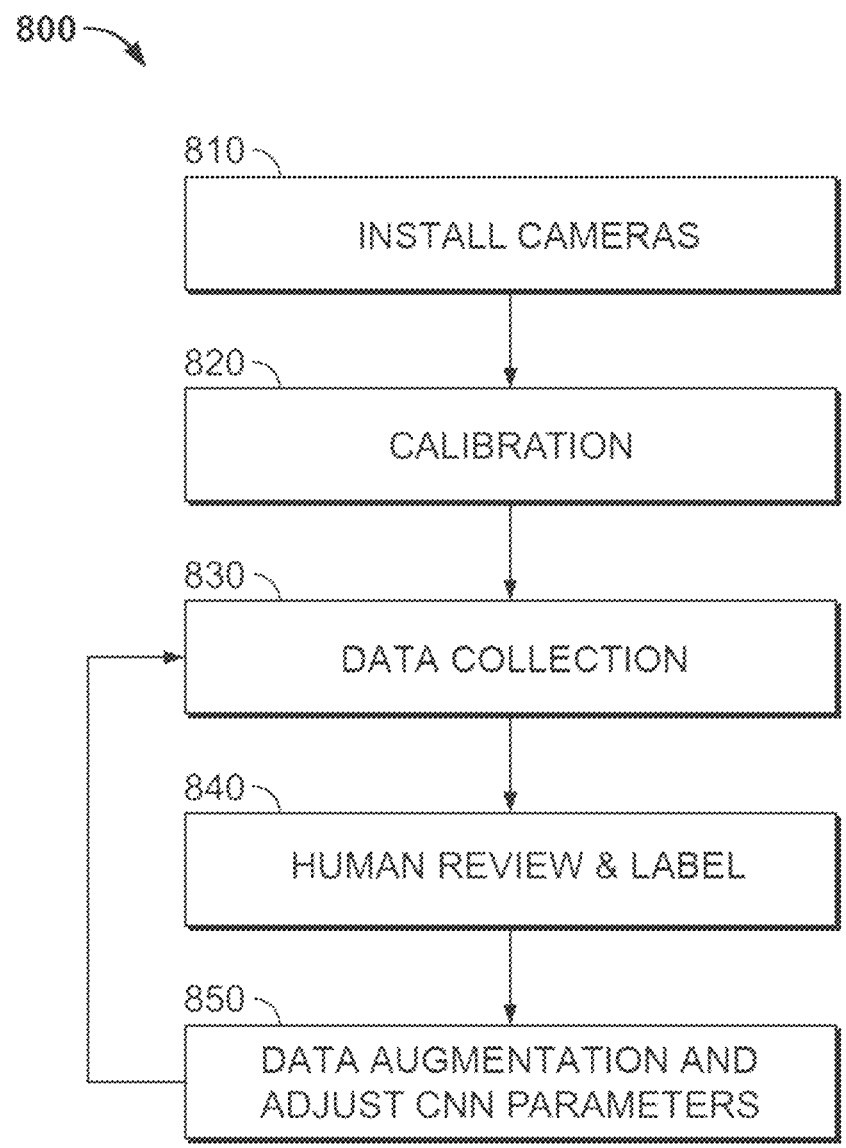
FIG. 7 is a flow diagram of a method for training a CNN model in accordance with an embodiment of the invention.

FIG. 7 is a flow diagram of a method 800 for training a convolutional neural network in accordance with an embodiment of the invention.

Step 810 states to install cameras. Cameras are set up and aimed at the work area. In embodiments, the work area is a grill, stove, fryer, or preparation area.

Step 820 states calibration. Calibration is performed to determine the extrinsic and intrinsic parameters for the sensors. Camera/sensor calibration may be performed as described herein, or otherwise as is known in the art.

Data Collection

With reference to step 830, target objects of interest are placed in the work area and image input data is generated and collected which comprises an image of multiple channels representing the intensity of light at various wavelengths (e.g., red, green, blue, IR) and optionally depth. In embodiments, the CNN is trained on food items and utensils shown on a grill during the day. Examples of food items include, without limitation, steaks, burgers, burgers with cheese, chicken breasts, sausages, onions, and fish fillets placed on the grill. Examples of utensils include, without limitation, steak weights, spatulas, plates, bowls, and tongs. In embodiments, the CNN is trained on types of cuts of meat. In embodiments, the CNN is trained on classifying a food item as a fillet mignon, porterhouse, ribeye, skirt, New York, breast, leg, fillet, etc. Images are obtained showing one or more steak weights on the grill and on steaks.

Additionally, in embodiments, the CNN is trained on cooking various by-matter arising from cooking. By-matter may be anticipated such as char on the grill or liquid drippings from cooking meat, or it may be unanticipated such as smoke or fire. In embodiments, the image data is transformed from the RGB to the HSV space for detection of the by-matter.

Labeling

With reference to step 840, the image data or a portion of the image data is presented to a human user who identifies relevant objects in the image (classifies) and creates bounding boxes for the images (locates). The data from the human user is then recorded into the form of the output layer that the CNN should create when presented with the input image data.

Training and Data Augmentation

With reference to step 850, the input images and output layer are divided into training, validation and test sets. The training data set is presented to the model and periodically compared with the validation data set. The parameters of the CNN are adjusted based on the results of the validation set. The process is repeated multiple times (multi-stage). With each iteration, the weighting factors of the CNN can be modified. Examples of weighting factors adjusted to tune the model include, without limitation, learning rate, momentum, and batch size.

Semi-Manual Training

In embodiments, and subsequent to the first stage of training described above, a second semi-manual training comprises the following:
(a) record additional images during the day,
(b) apply the trained model from stage 1 to obtain estimates of the location and class for the labels,
(c) adjust the labels manually,
(d) split the data into training, validation, and test sets.
(e) Train the model and evaluate performance versus the validation data set. Adjust the model parameters as described above and repeat the training process until the performance of the model achieves at least the desired accuracy (preferably 99% or more) with the validation data set. The above described semi-manual training method significantly speeds up the training process because it does not require each and every label to be performed by hand/human.

Additionally, in some embodiments, the collected data are used to generate synthetic data by using photorealistic rendering where objects are placed over a variety of backgrounds to create novelty. An example of such a rendering is a ribeye steak on a grill. These synthetic data can be combined with real data to increase the detection and classification accuracy and decrease the data collection and labeling costs of neural networks. In embodiments, synthetic data is combined with real data according to a specified ratio which can be tuned depending on the situation to achieve the requisite accuracy. A preferred ratio of synthetic data to real data is 80/20 or greater.

In some embodiments, the collected data are used to generate synthetic data by using generative adversarial networks (GANs) where one neural network is trained to generate images and another neural network is trained to detect if the generated images are real. These networks can be trained together to obtain a system which produces synthetic data with a high degree of realism. These synthetic data can be combined with real data to increase the detection and classification accuracy and decrease the data collection and labeling costs of neural networks. In embodiments, GAN-based synthetic data is combined with real data according to a ratio of that is varied based on the situation. The more synthetic data, the lower the cost of data. A preferred ratio of GAN-based synthetic data to real data is 80/20 or greater. Examples of GANs algorithms/techniques are described in Goodfellow et al., Generative adversarial networks, Communications of the ACM, Volume 63, Issue 11, November 2020 pp 139-144.

In embodiments, specific categories of data are generated synthetically. In a preferred embodiment, dangerous types of by-matter data are generated synthetically such as fire and smoke in the kitchen, and the food and kitchen implements are generated using real data.

In a preferred embodiment, automated food preparation assistants are deployed in various kitchens and each automated food preparation assistant is operable to communicate with a central server such as a remote cloud based server. For example, a plurality of restaurants may each install the automated food preparation assistant as described herein and each of the automated food assistants is programmed to continuously send image data of the food items to the central server. The central server uses the different sets of image data for training (whether unsupervised training or other training techniques) a universal food item recognition model.

The local automated food preparation assistants are periodically updated with the improved food item recognition mode.

Additionally, in embodiments, the output vector from the CNN object detector can comprise multiple instances of known food items that are differentiated by the degree that they are cooked (namely, "degree of doneness"). In embodiments, the measure of cooking is the internal temperature of the object, such as a steak cooked to medium rare corresponding to an internal temperature of 130 to 135 degrees Fahrenheit. In embodiments, the CNN is trained to detect not just individual objects and their location, but the internal temperature of the objects. Measurements of the internal temperature of the food item can be taken with temperature sensors and used in the output vector for the training of the CNN. In some embodiments, these temperature measurements are taken dynamically by a thermocouple that is inserted into the food item.

In embodiments, an alternate or additional contact-less thermal model is used to track the estimated internal temperature of various food items to determine when they are cooked to the appropriate level. In these cases, data can be provided by the Kitchen Scene Understanding Engine on how long the various items have been cooked and their current surface temperature and or temperature history as measured by the IR camera.

Calibration

A wide variety of techniques may be employed to calibrate the cameras or sensors.

In embodiments, each camera or sensor is calibrated with a calibration target capable of obtaining known high signal-to-noise ratio observations in a known coordinate frame.

In other embodiments, two or more cameras are calibrated by observing the tracked object over time with each of the cameras. The Perspective-n-Point problem is solved to determine where in space each food item is relative to each camera. Knowing the 3D coordinates of the food item(s) for each camera allows the cameras to be calibrated to one another. An example technique for solving the Perspective-n-Point is described in Xiao-Shan Gao et al. "Complete solution classification for the perspective-three-point problem," in IEEE Transactions on Pattern Analysis and Machine Intelligence, vol. 25, no. 8, pp. 930-943, August 2003.

In other embodiments, two or more cameras can be calibrated through stereo pair matching, by looking for features which are similar between views and corresponding them.

Figure 8:
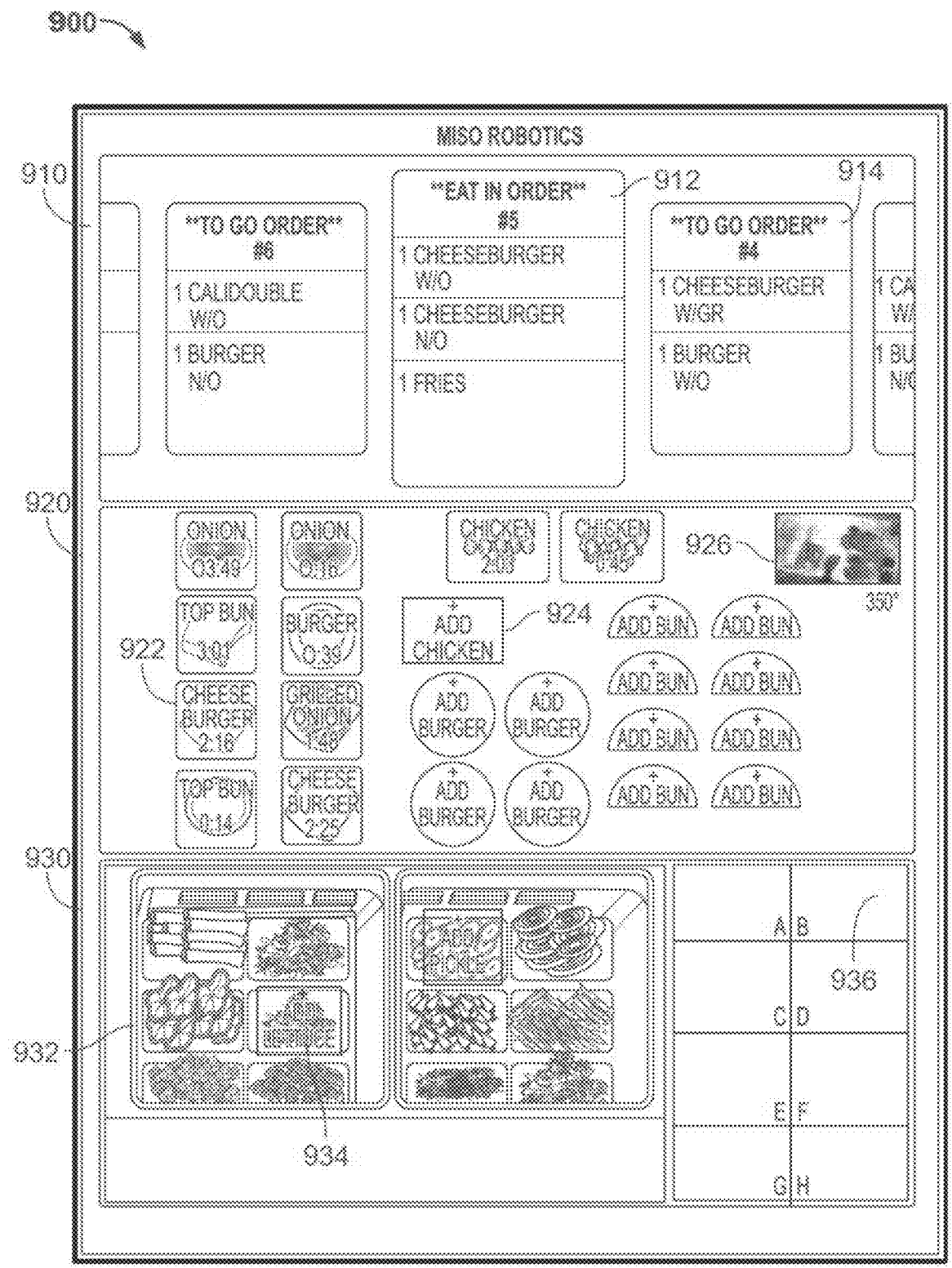
FIG. 8 illustrates a graphical user interface for a human kitchen worker in accordance with an embodiment of the invention.

FIG. 8 illustrates a graphical user interface (GUI) 900 of a display for communicating instructions and status of food items with human kitchen workers in accordance with an embodiment of the invention.

The GUI 900 shows an order window 910, grill window 920, and assembly window 930.

Order window 910 shows, in real time, different types of customer order information such as an eat in order 912 and to go order 914. Each order may feature identifying label, a food item, menu item, topping or other modification. As orders are received, the robotic kitchen assistant carries out the methods described herein and posts the status of the order in the order window 910. As orders are completed, the robotic kitchen assistant removes the order from the screen or otherwise identifies it as completed.

Grill window 920 shows a real time image of the grill including all food items placed thereon 922. As described herein, the food items are recognized and located as they are placed on the grill. In the embodiment shown in FIG. 8, the image is augmented with labels on top of each food item. Additional information is displayed with the food item including time remaining to complete cooking, or if applicable, to flip the food item. In embodiments, total time for the food item on the grill is displayed.

Grill window 920 also indicates instructions to add new food items such as to add chicken 924, or add burger, or add bun in view of the customer order information, timing estimates, state status of the food items, and recipe information. Exemplary instructions for the grill window include, without limitation, remove steak, flip steak, remove steak weight, add steak, etc.

Grill window 920 additionally shows a real time infrared image 926 of the grill and a computed temperature associated with the grill. The use of infrared cameras or sensors assist not only for temperature evaluation, but also in food item recognition and location and for monitoring internal temperature of the food items on the grill.

Assembly window 930 shows, in real time, the food and assembly area including food item bins 932 and augments the image with instructions requesting more ingredients when an ingredient is below a threshold amount. For example, the instruction to "ADD LETTUCE" (corresponding to reference numeral 934) is displayed over the low/empty lettuce bin.

Additionally, a portion of the workspace accessible by a robotic kitchen assistant is shown divided into a grid 936 and food items can be transferred to spaces A-H in the grid and additional preparation instructions can be displayed that reference the position of particular items in the grid.

Figure 9:
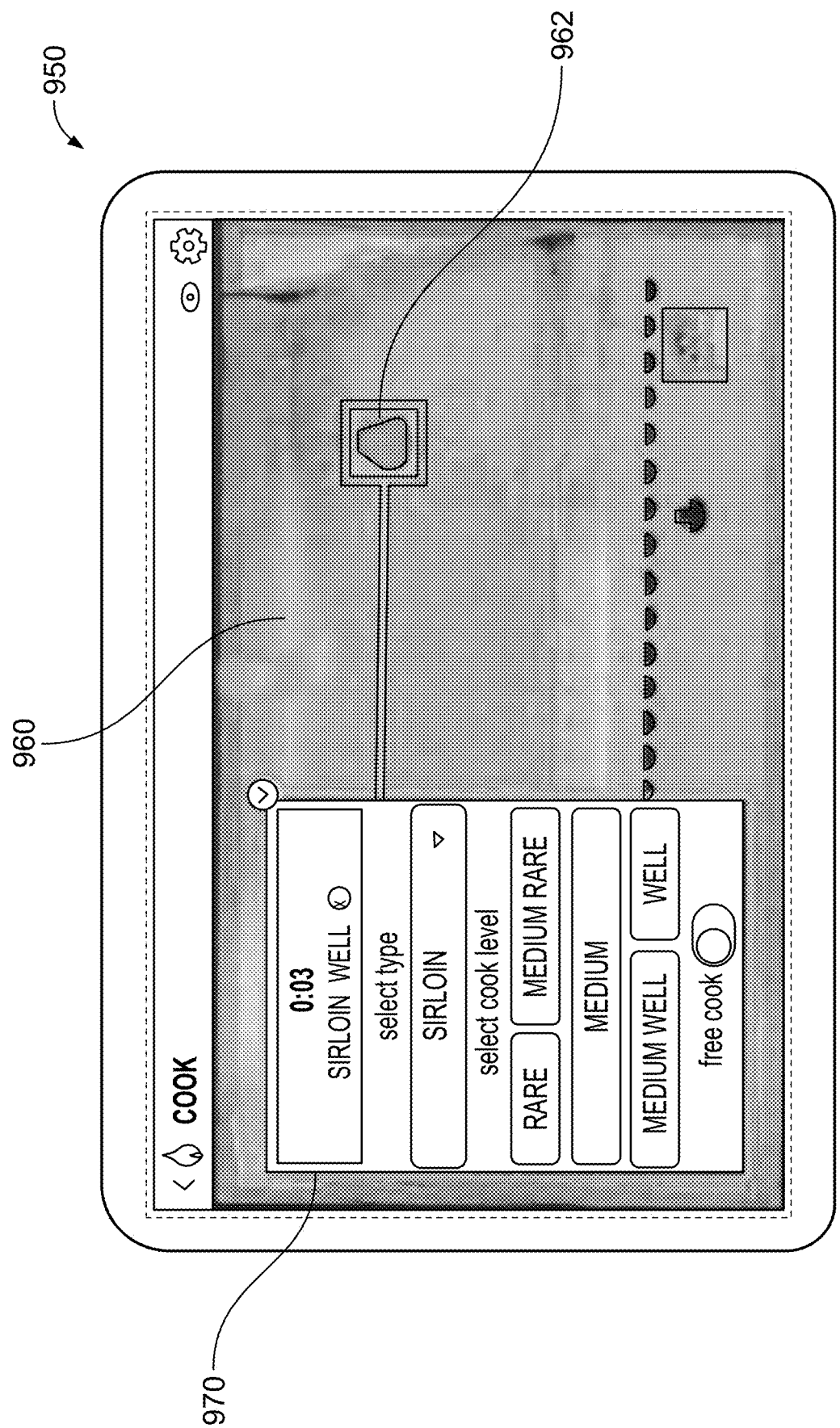
FIG. 9 illustrates another graphical user interface for a human kitchen worker in accordance with an embodiment of the invention.

FIG. 9 illustrates another graphical user interface (GUI) 950 on a touch screen display (e.g., tablet) for communicating instructions and the status of food items with human kitchen workers in accordance with an embodiment of the invention.

The GUI 950 shows a real time image of the grill 960 including all food items 962 placed thereon. In the embodiment shown in FIG. 9, the image is augmented with a callout label 970 to the side of the food item. The call out label is shown indicating the selected meat type or cut (e.g., sirloin, ribeye, skirt, filet, porterhouse, etc.), cook level, desired time, and time remaining to complete cooking for the food item in view of the selected cook level.

As described above, the kitchen scene understanding engine, and particularly, the object tracker continuously updates the state of the system for all objects on the grill including their identity, location, and elapsed time. The food preparation supervisory engine determines what steps are to be completed next. For example, the food preparation supervisory engine alerts the human worker to remove or flip a steak. The information can be displayed on the GUI to the human worker.

GUI 950 additionally shows a tab for "free cook." By activating "free cook" the human worker can turn off the kitchen assistant timer or alerts in order to cook the food item as desired/customized to a level outside of the system's predetermined options. Indeed, embodiments of the invention are operable to prompt the human worker for a wide range of inputs, each of which is used in computing instructions and preparing food as described herein.

Still other modifications and variations can be made to the disclosed embodiments without departing from the subject invention. In embodiments, the processor is operable to transform and process the image data from the RGB cameras to a different or second color space such as the hue shift, saturation, and value (HSV) space. In the HSV color space, we have found that certain by-products generated in the kitchen are easier to detect including (a) smoke and fire arising from the grill, (b) char build up on the grill, and (c) liquids such as liquid dripping from the meats as they are cooked on the grill. In embodiments, the processor is programmed and operable to utilize this HSV color space data as inputs or features to the models and modules discussed herein to assist in determining: (i) occlusion decisions (e.g., detect smoke occlusion for use in the occlusion mask module 630), (ii) tracking rules (e.g., detect a dripping steak can be applied as a custom rule 624 for matching, and result in a higher probability to be a tracked based on detecting drippings), (iii) worker alerts for fire (e.g., detect excess smoke arising from cooking equipment—send/display instruction to worker to immediately attend to fire), and (iv) worker alerts for the food preparation equipment condition (e.g., grill contains char marks—send/display instruction to worker to clean grill). Indeed, the processor may be operable to provide a wide range of alerts based on processing the image data in a second color space including without limitation smoke alerts, grill-clean alerts, and liquid or fire alerts.

We claim:

1. An automated food preparation assistant system for preparing a food item comprises:
    a first sensor configured to obtain first visible spectrum image data;
    a second sensor configured to obtain second visible spectrum image data; and
    at least one processor programmed and operable to:
        detect food objects of interest based on image data from the first sensor and image data from the second sensor, wherein the food objects comprise at least one food item and optionally, a non-food item, and wherein the detecting comprises computing location and identity of the food objects;
        track the location of the detected food objects, wherein the tracking comprises:
            select a unique filter from a plurality of filters based on the motion of the food object being tracked;
            compute a current predicted location of the food object based on the selected filter;
            compare the current predicted location of the food object and a current measured location of the food object including applying custom matching resolution rules for tracking unobserved food items if a non-food item is detected between the sensors and the unobserved food items;
            create an occlusion mask for the non-food item detected between the sensors and the unobserved food items;
            evaluate whether the food item is occluded based on the occlusion mask; and
            update the location of the food item only if the food item is not occluded; and
        determine an instruction relating to the food item.

2. The system of claim 1, wherein the first processor is operable to run a convolutional neural network to detect the food object.

3. The system of claim 2, wherein the convolutional neural network is trained to detect the food object from a common perspective view.

4. The system of claim 3, wherein the instruction is a command for preparation of food items.

5. The system of claim 4, further comprising a display, and the command is provided to the display.

6. The system of claim 5, further comprising a robotic arm, wherein the command is provided to the robotic arm for executing the command.

7. The system of claim 1, further comprising a hood mount for each sensor.

8. The system of claim 1, wherein the processor is operable to select the unique filter from a plurality of filters based on whether the food object is stationary.

9. The system of claim 1, wherein the first processor is operable to generate hue saturation value data from the first and second sensor, and input the hue saturation value data into a detection model to distinguish the food items being cooked from the outline of cooking by-products/matter from previously cooked food items based on the hue saturation value data.

10. The system of claim 1, wherein the non-food item is selected from a kitchen worker, an appendage of a kitchen worker, and a kitchen implement.

11. The system of claim 1, wherein the applying the custom matching resolution rules comprises assuming a steak is under a steak weight if the steak weight is detected.

* * * * *